US011566334B2

(12) United States Patent
Moskovchenko et al.

(10) Patent No.: US 11,566,334 B2
(45) Date of Patent: Jan. 31, 2023

(54) SELECTIVE REMOVAL OF NOBLE METALS USING ACIDIC FLUIDS, INCLUDING FLUIDS CONTAINING NITRATE IONS

(71) Applicant: Greene Lyon Group, Inc., Beverly, MA (US)

(72) Inventors: Svitlana Moskovchenko, Montreal (CA); Andre Brosseau, Montreal (CA)

(73) Assignee: Greene Lyon Group, Inc., Beverly, MA (US)

( * ) Notice: Subject to any disclaimer, the term of this patent is extended or adjusted under 35 U.S.C. 154(b) by 0 days.

(21) Appl. No.: 17/077,955

(22) Filed: Oct. 22, 2020

(65) Prior Publication Data

US 2021/0180199 A1 Jun. 17, 2021
US 2022/0074061 A9 Mar. 10, 2022

Related U.S. Application Data

(63) Continuation of application No. 15/738,333, filed as application No. PCT/US2016/038896 on Jun. 23, 2016, now Pat. No. 11,136,681.

(60) Provisional application No. 62/210,101, filed on Aug. 26, 2015, provisional application No. 62/184,172, filed on Jun. 24, 2015.

(51) Int. Cl.
| C25C 1/00 | (2006.01) |
| C25C 1/20 | (2006.01) |
| C01G 5/00 | (2006.01) |
| C22B 3/08 | (2006.01) |
| C22B 3/06 | (2006.01) |
| C22B 11/00 | (2006.01) |
| C25C 7/00 | (2006.01) |
| C01G 7/00 | (2006.01) |
| C25C 7/02 | (2006.01) |

(52) U.S. Cl.
CPC .............. *C25C 1/20* (2013.01); *C01G 5/00* (2013.01); *C01G 7/00* (2013.01); *C22B 3/065* (2013.01); *C22B 3/08* (2013.01); *C22B 11/04* (2013.01); *C25C 7/00* (2013.01); *C25C 7/02* (2013.01); *Y02P 10/20* (2015.11)

(58) Field of Classification Search
CPC .... C25C 7/00; C25C 7/02; C25C 1/20; C22B 3/065; C22B 3/08; C22B 11/04; C01G 7/00; C01G 5/00; Y02P 10/234
USPC .............. 423/22, 27, 28, 32, 33, 41; 75/744; 205/569
See application file for complete search history.

(56) References Cited

U.S. PATENT DOCUMENTS

| 1,335,277 A | 3/1920 | De Golyer et al. |
| 2,185,858 A | 1/1940 | Mason |
| 2,574,620 A | 11/1951 | Carlsson |
| 2,607,721 A | 8/1952 | Holman |
| 2,794,829 A | 6/1957 | Van Der Waarden et al. |
| 3,616,332 A | 10/1971 | Miller et al. |
| 3,788,958 A | 1/1974 | Dillenberg |
| 3,935,005 A | 1/1976 | Solidum et al. |
| 4,056,450 A | 11/1977 | McCauslan |
| 4,078,918 A | 3/1978 | Perman |
| 4,229,270 A | 10/1980 | Subramanian et al. |
| 4,374,008 A | 2/1983 | Natansohn et al. |
| 4,426,225 A | 1/1984 | Ida et al. |
| 4,456,473 A | 6/1984 | Jost |
| 4,456,474 A | 6/1984 | Jost |
| 4,606,797 A | 8/1986 | Taylor et al. |
| 4,663,005 A | 5/1987 | Edson |
| 4,678,552 A | 7/1987 | Chen |
| 5,098,534 A | 3/1992 | Nakamura et al. |
| 5,433,893 A | 7/1995 | Jost et al. |
| 5,491,247 A | 2/1996 | Gernon |
| 5,728,854 A | 3/1998 | Chen et al. |
| 5,846,288 A | 12/1998 | Jost et al. |
| 5,963,772 A | 10/1999 | Jost et al. |
| 6,129,779 A | 10/2000 | Bohland et al. |

(Continued)

FOREIGN PATENT DOCUMENTS

| CN | 1925915 A | 3/2007 |
| CN | 101082080 A | 12/2007 |
| CN | 101392325 A | 3/2009 |
| CN | 102939396 A | 2/2013 |
| CN | 103468969 A1 | 12/2013 |

(Continued)

OTHER PUBLICATIONS

U.S. Appl. No. 16/418,592, filed May 21, 2019, Moskovchenko et al.
U.S. Appl. No. 16/389,009, filed Apr. 19, 2019, Moskovchenko et al.

(Continued)

*Primary Examiner* — Steven J Bos
(74) *Attorney, Agent, or Firm* — Wolf, Greenfield & Sacks, P.C.

(57) ABSTRACT

The recovery of noble metal(s) from noble-metal-containing material is generally described. The noble metal(s) can be recovered selectively, in some cases, such that noble metal(s) is at least partially separated from non-noble-metal material within the material. Noble metal(s) may be recovered from noble-metal-containing material using mixtures of acids, in some instances. In some cases, the mixture can comprise nitric acid and/or another source of nitrate ions and at least one supplemental acid, such as sulfuric acid, phosphoric acid, and/or a sulfonic acid. The amount of nitrate ions within the mixture can be, in some instances, relatively small compared to the amount of supplemental acid within the mixture. In some cases, the recovery of noble metal(s) using the acid mixtures described herein can be enhanced by transporting an electric current between an electrode and the noble metal(s) of the noble-metal-containing material. In some cases, acid mixtures can be used to recover silver from particular types of scrap materials, such as scrap material comprising silver metal and cadmium oxide and/or scrap material comprising silver metal and tungsten metal.

20 Claims, 12 Drawing Sheets

(56) References Cited

U.S. PATENT DOCUMENTS

| | | |
|---|---|---|
| 6,767,447 B2 | 7/2004 | Uno et al. |
| 6,783,690 B2 | 8/2004 | Kologe et al. |
| 6,790,338 B2 | 9/2004 | Kinstle et al. |
| 6,986,192 B2 | 1/2006 | Fitch |
| 7,166,145 B1 | 1/2007 | Han |
| 7,635,534 B2 | 12/2009 | Shore et al. |
| 7,972,413 B2 | 7/2011 | Xia |
| 8,211,287 B2 | 7/2012 | Kato et al. |
| 8,317,896 B2 | 11/2012 | Homma et al. |
| 8,709,277 B2 | 4/2014 | Takahashi et al. |
| 8,722,609 B2 | 5/2014 | Choczaj et al. |
| 8,728,253 B2 | 5/2014 | Fassbender et al. |
| 9,090,985 B2 | 7/2015 | Hsu |
| 9,238,850 B2 | 1/2016 | Korzenski et al. |
| 9,518,327 B2 | 12/2016 | Hsu et al. |
| 11,136,681 B2 | 10/2021 | Moskovchenko et al. |
| 11,193,214 B2 | 12/2021 | Moskovchenko et al. |
| 2004/0173057 A1 | 9/2004 | Fairbourn |
| 2005/0139488 A1 | 6/2005 | Ogihara et al. |
| 2006/0166847 A1 | 7/2006 | Walker et al. |
| 2007/0183951 A1 | 8/2007 | Nakatsu et al. |
| 2008/0269096 A1 | 10/2008 | Visintin et al. |
| 2009/0226352 A1 | 9/2009 | Hsu et al. |
| 2009/0272227 A1 | 11/2009 | Creasey et al. |
| 2009/0321272 A1 | 12/2009 | Kato et al. |
| 2010/0154835 A1 | 6/2010 | Dimeo et al. |
| 2010/0314242 A1 | 12/2010 | Lee et al. |
| 2011/0017020 A1 | 1/2011 | Homma et al. |
| 2011/0028306 A1 | 2/2011 | Variabel et al. |
| 2012/0036962 A1 | 2/2012 | Yun et al. |
| 2012/0090433 A1 | 4/2012 | Butler |
| 2012/0169997 A1 | 7/2012 | Iwaki et al. |
| 2012/0274008 A1 | 11/2012 | Akridge |
| 2012/0292201 A1 | 11/2012 | Hsu |
| 2012/0328494 A1 | 12/2012 | Dreisinger et al. |
| 2013/0276284 A1 | 10/2013 | Brosseau et al. |
| 2013/0336857 A1 | 12/2013 | Korzenski et al. |
| 2014/0243249 A1 | 8/2014 | Hsu |
| 2015/0376735 A1 | 12/2015 | Hsu |
| 2016/0102408 A1 | 4/2016 | Hsu |
| 2016/0319444 A1 | 11/2016 | Moskovchenko et al. |
| 2016/0362804 A1 | 12/2016 | Chen et al. |
| 2017/0058379 A1 | 3/2017 | Norkett et al. |
| 2017/0101699 A1 | 4/2017 | Moskovchenko et al. |
| 2018/0112289 A1 | 4/2018 | Foley et al. |
| 2018/0230571 A1 | 8/2018 | Willcox |
| 2018/0312985 A1 | 11/2018 | Moskovchenko et al. |
| 2020/0040475 A1 | 2/2020 | Moskovchenko et al. |
| 2020/0048734 A1 | 2/2020 | Moskovchenko et al. |

FOREIGN PATENT DOCUMENTS

| | | |
|---|---|---|
| CN | 201811343268.X | 5/2020 |
| EP | 0363314 A1 | 4/1990 |
| EP | 16815255.1 | 10/2020 |
| GB | 934850 A | 8/1963 |
| JP | S49-37496 B1 | 10/1974 |
| JP | H08-041676 A | 2/1996 |
| JP | H11-302626 A1 | 11/1999 |
| JP | 2016-554262 | 11/2018 |
| WO | WO 99/45158 A1 | 9/1999 |
| WO | WO 02/42503 A1 | 5/2002 |
| WO | WO 2009/094732 A1 | 8/2009 |
| WO | WO 2011/024164 A1 | 3/2011 |
| WO | WO 2011/030622 A1 | 3/2011 |
| WO | WO 2011/130622 A1 | 10/2011 |
| WO | WO 2011/154607 A1 | 12/2011 |
| WO | WO 2012/024603 A2 | 2/2012 |
| WO | WO 2012/048079 A2 | 4/2012 |
| WO | WO 2013/090517 A1 | 6/2013 |
| WO | WO 2013/152260 A1 | 10/2013 |
| WO | WO 2015/130965 | 9/2015 |
| WO | WO 2016/210051 A1 | 12/2016 |

OTHER PUBLICATIONS

U.S. Appl. No. 15/738,333, filed Dec. 20, 2017, Moskovchenko et al.
EP 14871936.2, Aug. 2, 2017, Extended European Search Report.
EP 14871936.2, Jul. 2, 2020, Decision to Grant.
PCT/US14/71419, Jun. 11, 2015, International Search Report and Written Opinion.
PCT/US14/71419, Jun. 30, 2016, International Preliminary Report on Patentability.
CN 201580010231.3, Mar. 1, 2017, Office Communication.
CN 201580010231.3, Feb. 24, 2018, Office Communication.
EP 15754631.8, Jan. 31, 2018, Supplemental Partial European Search Report.
EP 15754631.8, Jul. 17, 2018, Extended European Search Report.
PCT/US15/17821, May 28, 2015, International Search Report and Written Opinion.
PCT/US2015/17821, Jun. 30, 2016, International Preliminary Report on Patentability.
CN 201680048698.1, Nov. 26, 2018, Office Communication.
CN 201680048698.1, Nov. 29, 2019, Office Communication.
CN 201680048698.1, May 18, 2020, Office Communication.
PCT/US2016/038896, Sep. 13, 2016, Invitation to Pay Additional Fees.
PCT/US2016/038896, Nov. 7, 2016, International Search Report and Written Opinion.
PCT/US2016/038896, Jan. 4, 2018, International Preliminary Report on Patentability.
Office Communication dated Apr. 4, 2018 for U.S. Appl. No. 15/106,013.
Office Communication dated Nov. 21, 2018 for U.S. Appl. No. 15/106,013.
Office Communication dated Sep. 4, 2020 for U.S. Appl. No. 16/418,592.
Office Communication dated Feb. 25, 2021 for U.S. Appl. No. 16/418,592.
Office Communication dated Oct. 19, 2018 for U.S. Appl. No. 15/121,974.
Office Communication dated Apr. 28, 2020 for U.S. Appl. No. 16/389,009.
Office Communication dated Dec. 21, 2020 for U.S. Appl. No. 16/389,009.
Notice of Allowance dated Jul. 29, 2020 for U.S. Appl. No. 15/738,333.
Office Communication dated Jan. 26, 2021 for U.S. Appl. No. 15/738,333.
Office Communication for U.S. Appl. No. 16/418,592 dated Apr. 26, 2021.
Gijsemans et al., Recovery of rare earths from the green lamp phosphor $LaPO_4:Ce^{3+},Tb^{3+}$ (LAP) by dissolution in concentrated methanesulphonic acid. RSC Adv. Jul. 2018;8(46):26349-55.
U.S. Appl. No. 17/570,239, filed Jan. 6, 2022, Moskovchenko et al.
Office Communication for EP Application No. 15754631.8 dated May 27, 2021.
Office Communication for U.S. Appl. No. 16/389,009 dated Jul. 7, 2021.
Notice of Allowance for U.S. Appl. No. 16/418,592 dated Aug. 4, 2021.
Extended European Search Report for EP Application No. 14871936.2 dated Aug. 2, 2017.
Decision to Grant for EP Application No. 14871936.2 dated Jul. 2, 2020.
Office Communication for U.S. Appl. No. 15/106,013 dated Apr. 4, 2018.
Office Communication for U.S. Appl. No. 15/106,013 dated Nov. 21, 2018.
Office Communication for U.S. Appl. No. 16/418,592 dated Sep. 4, 2020.
Office Communication for U.S. Appl. No. 16/418,592 dated Feb. 25, 2021.
International Search Report and Written Opinion for PCT/US14/71419 dated Jun. 11, 2015.

(56) References Cited

OTHER PUBLICATIONS

International Preliminary Report on Patentability for PCT/US14/71419 dated Jun. 30, 2016.
Office Communication for CN Application No. 201580010231.3 dated Mar. 1, 2017.
Office Communication for CN Application No. 201580010231.3 dated Feb. 24, 2018.
Office Communication for CN Application No. 201811343268.X dated May 6, 2020.
Supplementary Partial European Search Report for EP Application No. 15754631.8 dated Jan. 31, 2018.
Extended European Search Report for EP Application No. 15754631.8 dated Jul. 17, 2018.
Office Communication for JP App. No. 2016-554262 dated Nov. 12, 2018.
Office Communication for U.S. Appl. No. 15/121,974 dated Oct. 19, 2018.
Office Communication for U.S. Appl. No. 16/389,009 dated Apr. 28, 2020.
Office Communication for U.S. Appl. No. 16/389,009 dated Dec. 21, 2020.
International Search Report and Written Opinion for PCT/US15/17821 dated May 28, 2015.
International Preliminary Report on Patentability for PCT/US2015/017821 dated Jun. 30, 2016.
Office Communication for CN App. No. 201680048698.1 dated Nov. 26, 2018.
Office Communication for CN App. No. 201680048698.1 dated Nov. 29, 2019.
Office Communication for CN Application No. 201680048698.1 dated May 18, 2020.
Office Communication for EP App. No. 16815255.1 dated Oct. 1, 2020.
Notice of Allowance for U.S. Appl. No. 15/738,333 dated Jul. 29, 2020.
Office Communication for U.S. Appl. No. 15/738,333 dated Jan. 26, 2021.
Invitation to Pay Additional Fees for PCT/US2016/038896 dated Sep. 13, 2016.
International Search Report and Written Opinion for PCT/US2016/038896 dated Nov. 7, 2016.
International Preliminary Report on Patentability for PCT/US2016/038896 dated Jan. 4, 2018.
[No Author Listed] Lutropur MSA, Lutropur MSA 100. The "green" acid for use in cleaners. BASF, EMV 0113-00 e08.2008 . 16 pages.
[No Author Listed], Eco-Goldex Internet Home Page. Quebec, Canada. Available Aug. 31, 2016. Last accessed Mar. 3, 2017 from <http://www.eco-goldex.com/>. 2 pages.
[No Author Listed], Revolutionary New Processes for Stripping Precious Metals. Greene Lyon Group Press Release. Aug. 2014.
[No Author Listed], UWin Nanotech Co., Ltd. Internet Home Page. Taiwan. Available Nov. 9, 2012. Last accessed Mar. 3, 2017 from <http://uwin-nano.com/>. 1 page.
Gernon et al., Environmental benefits of methanesulfonic acid: Comparative properties and advantages. Green Chem. Jun. 1999:127-40.
Gromov et al., The extraction of silver from silver containing scrap. Zhurnal Prikladnoi Khimii. Jul. 1998;71(7):1067-70.
Lin et al., Electrochemical stripping of gold from Au—Ni—Cu electronic connector scrap in an aqueous solution of thiourea. Journal of Applied Electrochemistry. Feb. 1994;24(2):157-65.
Wang et al., Process for Recovering Silver form Copper-based Silver Plated Scrap and Copper-based Silver-containing Electrical Contact Scrap. China Materials Recycling. Dec. 1998;5:14-7.
Zhang et al., Study of Gold Leaching from PCB by Thiocyanate Process. Precious Metals. Feb. 2008;29(1):11-4.

Scrap item before processing

Scrap item after processing

SELECTIVE REMOVAL OF NOBLE METALS USING ACIDIC FLUIDS, INCLUDING FLUIDS CONTAINING NITRATE IONS

RELATED APPLICATIONS

This application is a continuation of U.S. patent application Ser. No. 15/738,333, filed Dec. 20, 2017, which is a U.S. National Stage Application of International Patent Application No. PCT/US2016/038896, filed Jun. 23, 2016, which claims priority under 35 U.S.C. § 119(e) to U.S. Provisional Patent Application No. 62/184,172, filed Jun. 24, 2015 and U.S. Provisional Patent Application No. 62/210,101, filed Aug. 26, 2015, each of which is incorporated herein by reference in its entirety for all purposes.

TECHNICAL FIELD

The disclosure is generally related to the recovery of noble metal(s) from noble-metal-containing materials.

SUMMARY

The recovery of noble metal(s) (e.g., gold, silver, platinum, palladium, and/or alloys of these) from materials containing noble metal(s) is generally described. According to certain embodiments, the noble metal(s) can be recovered selectively, such that noble metal(s) is at least partially separated from non-noble-metal material (e.g., base metal(s)) within the noble-metal-containing material. The subject matter of the present invention involves, in some cases, interrelated products, alternative solutions to a particular problem, and/or a plurality of different uses of one or more systems and/or articles.

Certain embodiments relate to methods of recovering noble metal(s) from a noble-metal-containing material. In some embodiments, the method comprises exposing the material comprising the noble metal(s) and at least one base metal to a mixture comprising nitrate ions and at least one supplemental acid; and recovering at least a portion of the noble metal(s) from the noble-metal-containing material, wherein the amount of nitrate ions within the mixture is less than or equal to about 10 wt %.

In some embodiments, the method comprises exposing the noble-metal-containing material comprising the noble metal(s) and at least one base metal to a fluid comprising an oxidant having the ability to dissolve the noble metal(s); and recovering at least a portion of the noble metal(s) from the noble-metal-containing material; wherein the amount of the oxidant within the fluid is less than or equal to about 10 wt %.

According to some embodiments, the method comprises exposing the noble-metal-containing material comprising the noble metal(s) and at least one base metal to a mixture comprising sulfuric acid and nitrate ions and/or to a mixture comprising phosphoric acid and nitrate ions; and transporting an electric current between an electrode and the noble metal(s) of the noble-metal-containing material such that at least a portion of the noble metal(s) is removed from the noble-metal-containing material.

Certain embodiments are related to methods of recovering gold. In some embodiments, the method comprises combining water and a gold-containing solution comprising dissolved gold, nitrate ions and sulfuric acid, and/or nitrate ions and phosphoric acid to form a mixture, such that solid gold is precipitated within the mixture.

Some embodiments are related to methods of recovering silver. In some embodiments, the method comprises exposing a silver-containing material comprising the silver and cadmium oxide to a mixture of sulfuric acid and nitrate ions and/or to a mixture of phosphoric acid and nitrate ions such that the silver is dissolved by the mixture.

According to certain embodiments, the method comprises exposing a silver-containing material comprising the silver and tungsten to a mixture of sulfuric acid and nitrate ions and/or to a mixture of phosphoric acid and nitrate ions such that the silver is dissolved by the mixture.

Certain embodiments are related to systems for the recovery of noble metal(s) from noble-metal-containing material. According to certain embodiments, the system comprises a rotatable container positioned within a vessel configured to contain a liquid having a pH of less than about 2; and an electrically conductive pathway configured such that, when the noble-metal-containing material is contained within the rotatable container, the electrically conductive pathway remains in electrical communication with the noble-metal-containing material when the container is rotated.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
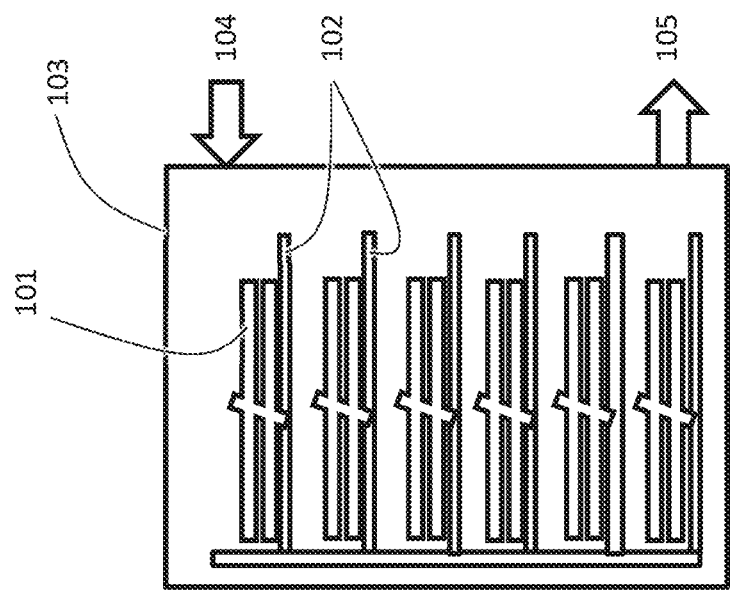
FIG. 1 is, according to one set of embodiments, a cross-sectional schematic illustration of a system in which noble-metal-containing materials are located on multiple racks immersed in a vessel containing a leaching solution, which can be recirculated.

The recovery of noble metal(s) (e.g., gold, silver, platinum, palladium, and/or alloys of these) from materials containing noble metal(s) is generally described. According to certain embodiments, the noble metal(s) can be recovered selectively, such that noble metal(s) is at least partially separated from non-noble-metal material (e.g., base metal(s)) within the noble-metal-containing material. According to certain embodiments, noble metal(s) may be recovered from noble-metal-containing material using mixtures of acids. In some embodiments, the mixture comprises nitrate ions (e.g., nitric acid and/or a source of nitrate ions that are not nitric acid) and at least one supplemental acid. For example, in some embodiments, mixtures comprising sulfuric acid and nitrate ions may be used to recover noble metal(s). In certain embodiments, mixtures comprising phosphoric acid and nitrate ions may be used to recover noble metal(s). In some embodiments, the amount of nitrate ions within the mixture may be relatively small compared to the amount of supplemental acid(s) (e.g., sulfuric acid or phosphoric acid) within the mixture. According to some embodiments, highly concentrated acids may be used in the recovery process (e.g., such that the leaching solution contains a relatively small amount of water). In some embodiments, the recovery of noble metal(s) using the acid mixtures described herein can be enhanced by transporting an electric current between an electrode and the noble-metal-containing material. Certain embodiments relate to the use of acid mixtures to recover silver from particular types of silver-containing materials. For example, some embodiments relate to the use of acid mixtures to recover silver from material comprising silver metal and cadmium oxide and/or material comprising silver metal and tungsten metal.

Certain of the processes involve the separation and/or recovery of noble metal(s) in their metallic form(s) from any type of noble-metal-containing items (e.g., scrap items, such as plated and/or filled scrap items). According to certain embodiments, noble metal(s) can be selectively recovered from the surface of base metals and/or base metal alloys. The noble metal(s) within the noble-metal-containing material can be in any suitable form. For example, in some embodiments, the noble metal(s) may be in the form of a plating or filling (e.g., which are collectively referred to as a "coating" everywhere below). Examples of items from which noble metal(s) may be recovered include, but are not limited to, noble-metal-filled jewelry, noble-metal-plated wires, noble-metal-filled copper, and/or noble-metal-plated electronic components (e.g., CPUs). The invention is not limited to the recovery of noble metal(s) from the surface of noble-metal-containing materials, and in some embodiments, noble metal(s) can be recovered from articles containing noble metal(s) within the bulk of the article (e.g., at a depth of at least 5% of the maximum cross-sectional diameter of the article). Recovery of noble metal(s) from the bulk can be achieved, for example, by exposing the noble-metal-containing material to the action of the leaching solutions after the noble-metal-containing material has been reduced to powder. Non-limiting examples of such noble-metal-containing materials include silver-tungsten pellets and ground electronic chips.

In some embodiments, silver may be recovered from silver-containing material that is substantially free of at least one (or all) other noble metal (e.g., including the other noble metal(s) in an amount of less than 2 wt %). For example, in some embodiments, silver may be recovered from silver-containing material that is substantially free of gold. According to certain embodiments, silver may be recovered from silver-containing material that is substantially free of platinum. In some embodiments, silver may be recovered from silver-containing material that is substantially free of palladium.

In certain embodiments, gold may be recovered from gold-containing material that is substantially free of at least one (or all) other noble metal (e.g., including the other noble metal(s) in an amount of less than 2 wt %). For example, in some embodiments, gold may be recovered from gold-containing material that is substantially free of silver. According to certain embodiments, gold may be recovered from gold-containing material that is substantially free of platinum. In some embodiments, gold may be recovered from gold-containing material that is substantially free of palladium.

In certain embodiments, platinum may be recovered from platinum-containing material that is substantially free of at least one (or all) other noble metal (e.g., including the other noble metal(s) in an amount of less than 2 wt %). For example, in some embodiments, platinum may be recovered from platinum-containing material that is substantially free of gold. According to certain embodiments, platinum may be recovered from platinum-containing material that is substantially free of silver. In some embodiments, platinum may be recovered from platinum-containing material that is substantially free of palladium.

In certain embodiments, palladium may be recovered from palladium-containing material that is substantially free of at least one (or all) other noble metal (e.g., including the other noble metal(s) in an amount of less than 2 wt %). For example, in some embodiments, palladium may be recovered from palladium-containing material that is substantially free of gold. According to certain embodiments, palladium may be recovered from palladium-containing material that is substantially free of silver. In some embodiments, palladium may be recovered from palladium-containing material that is substantially free of platinum.

In certain embodiments, multiple noble metals can be recovered at the same time. Any combination of noble metal(s) can be recovered from the noble-metal-containing materials described herein. For example, according to some embodiments, both gold and silver may be recovered from noble-metal-containing material that contains both gold and silver. In some embodiments, both gold and palladium may be recovered from noble-metal-containing material that contains both gold and palladium. In some embodiments, both gold and platinum may be recovered from noble-metal-containing material that contains both gold and platinum. According to some embodiments, both silver and platinum may be recovered from noble-metal-containing material that contains both silver and platinum. In some embodiments, both silver and palladium may be recovered from noble-metal-containing material that contains both silver and palladium. In some embodiments, both platinum and palladium may be recovered from noble-metal-containing material that contains both platinum and palladium. In some embodiments, gold, silver, and palladium are recovered from noble-metal-containing material that comprises gold, silver, and palladium. In certain embodiments, gold, silver, and platinum are recovered from noble-metal-containing material that comprises gold, silver, and platinum. In some embodiments, gold, platinum, and palladium are recovered from noble-metal-containing material that comprises gold, platinum, and palladium. In certain embodiments, silver, platinum, and palladium are recovered from noble-metal-containing material that comprises silver, platinum, and palladium. According to certain embodiments, gold, silver, platinum, and palladium are recovered from noble-metal-containing material that comprises gold, silver, platinum, and palladium.

In some embodiments, noble metal(s) can be recovered from a noble-metal containing material by exposing the material comprising the noble metal (and, in some embodiments, at least one base metal) to a mixture comprising one or more acids.

In some embodiments, the noble-metal-containing material is exposed to a mixture comprising nitrate ions and at least one supplemental acid. In some such embodiments, the amount of nitrate ions within the mixture is less than or equal to about 10 wt %, less than or equal to about 9 wt %, less than or equal to about 8 wt %, less than or equal to about 7 wt %, less than or equal to about 6 wt %, less than or equal to about 5 wt %, less than or equal to about 4 wt %, less than or equal to about 3 wt %, less than or equal to about 2 wt %, less than or equal to about 1 wt %, or less. In some embodiments, the amount of nitrate ions within the mixture is as little as about 4 wt %, as little as about 3 wt %, at little as about 2 wt %, as little as about 1 wt %, as little as about 0.5 wt %, as little as about 0.1 wt %, or less. In some embodiments, the amount of nitrate ions within the mixture is as little as about 0.07 wt %, as little as about 0.05 wt %, at little as about 0.02 wt %, as little as about 0.01 wt %, or less.

The nitrate ions can originate from a number of sources. In some embodiments, at least a portion (e.g., at least about 1 wt %, at least about 5 wt %, at least about 10 wt %, at least about 25 wt %, at least about 50 wt %, at least about 75 wt %, at least about 90 wt %, at least about 95 wt %, at least about 99 wt %, or all) of the nitrate ions originate from nitric acid and/or a nitrate salt. In certain embodiments, at least a portion (e.g., at least about 1 wt %, at least about 5 wt %, at least about 10 wt %, at least about 25 wt %, at least about 50 wt %, at least about 75 wt %, at least about 90 wt %, at least about 95 wt %, at least about 99 wt %, or all) of the nitrate ions originate from nitric acid. In certain embodiments, at least a portion (e.g., at least about 1 wt %, at least about 5 wt %, at least about 10 wt %, at least about 25 wt %, at least about 50 wt %, at least about 75 wt %, at least about 90 wt %, at least about 95 wt %, at least about 99 wt %, or all) of the nitrate ions originate from a source that is not nitric acid. In some embodiments, at least a portion (e.g., at least about 1 wt %, at least about 5 wt %, at least about 10 wt %, at least about 25 wt %, at least about 50 wt %, at least about 75 wt %, at least about 90 wt %, at least about 95 wt %, at least about 99 wt %, or all) of the nitrate ions originate from a nitrate salt. The nitrate salt may include, for example, nitrate ions ionically bonded to one or more metal ions. Non-limiting examples of nitrate salts include, but are not limited to, sodium nitrate ($NaNO_3$), potassium nitrate ($KNO_3$), magnesium nitrate ($Mg(NO_3)_2$), calcium nitrate ($Ca(NO_3)_2$), strontium nitrate ($Sr(NO_3)_2$), and barium nitrate ($Ba(NO_3)_2$). In some embodiments, the nitrate salt is substantially completely soluble in the leaching solution.

In some embodiments, the noble-metal-containing material is exposed to a mixture comprising nitric acid and at least one supplemental acid. In some such embodiments, the amount of nitric acid within the mixture is less than or equal to about 10 wt %, less than or equal to about 9 wt %, less than or equal to about 8 wt %, less than or equal to about 7 wt %, less than or equal to about 6 wt %, less than or equal to about 5 wt %, less than or equal to about 4 wt %, less than or equal to about 3 wt %, less than or equal to about 2 wt %, less than or equal to about 1 wt %, or less. In some embodiments, the amount of nitric acid within the mixture is as little as about 4 wt %, as little as about 3 wt %, at little as about 2 wt %, as little as about 1 wt %, as little as about 0.5 wt %, as little as about 0.1 wt %, or less. In some embodiments, the amount of nitric acid within the mixture is as little as about 0.07 wt %, as little as about 0.05 wt %, at little as about 0.02 wt %, as little as about 0.01 wt %, or less.

A variety of acids can be used as the supplemental acid. In some embodiments, the supplemental acid(s) is capable of forming an insoluble salt with noble metal(s) within the mixture. For example, in some embodiments, phosphoric acid and/or sulfuric acid can be used in combination with the nitric acid.

According to certain embodiments, the supplemental acid comprises a sulfonic acid. For example, the leaching solution may comprise, according to certain embodiments, a solution (e.g., an aqueous solution) of nitrate ions (e.g., nitric acid and/or a source of nitrate ions that is not nitric acid) and a sulfonic acid. In some, although not necessarily all, embodiments, it may be advantageous to use nitric acid as the source of nitrate ions when sulfonic acid is employed in the leaching solution. In some such embodiments, the leaching solution may also comprise an additional supplemental acid, such as sulfuric acid and/or phosphoric acid. Not wishing to be bound by any particular theory, it is believed that the presence of the sulfonic acid can provide high solubility of dissolved metals (e.g., dissolved noble metal(s)) in the leaching solution, according to certain embodiments.

In certain embodiments, the leaching solution comprises at least one sulfonic acid represented by:

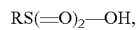

wherein R is an alkyl group containing 1-12 carbon atoms, an alkenyl group containing 1-12 carbon atoms, a hydroxyalkyl group containing 1-12 carbon atoms, or an aryl group containing 6-12 carbon atoms. In some embodiments, the leaching solution comprises an alkanesulfonic acid comprising an alkyl group containing 1-5 carbon atoms. Combinations of these may also be used.

According to certain embodiments, the supplemental acid of the leaching solution comprises an alkane sulfonic acid. Examples of suitable alkane sulfonic acids that can be used include, but are not limited to, ethanesulfonic acid, propanesulfonic acid, isopropanesulfonic acid, butanesulfonic acid, isobutanesulfonic acid, methanesulfonic acid, and combinations of two or more of these. In some embodiments, alkane sulfonic acid can be part of an aqueous solution used as the leaching solution. The leaching solution can contain, according to certain embodiments, the alkane sulfonic acid and nitrate ions (e.g., nitric acid and/or a source of nitrate ions that is not nitric acid). In some embodiments, the leaching solution can contain an alkane sulfonic acid, nitrate ions, and at least one additional supplemental acid (e.g., sulfuric acid and/or phosphoric acid).

In some embodiments, the supplemental acid of the leaching solution comprises methanesulfonic acid. Methanesulfonic acid is a strong organic acid that is generally substantially completely non-oxidizing at high concentrations, and that generally forms highly soluble salts with many metals. Methanesulfonic acid generally has a high dissociation constant, and is therefore a good electrolyte. Methanesulfonic acid also has substantially no odor, and it is sometimes described as being a "green acid" because of its ecological advantages (e.g., readily biodegradable, virtually VOC free, having low TOC, making hardly any contribution to COD, being free of nitrogen, phosphorus and halogens, etc.).

According to certain embodiments, the leaching solution comprises persulfuric acid. The persulfuric acid may be present in place of or in addition to a sulfonic acid in the leaching solution (including any of the sulfonic acids mentioned elsewhere herein, and mixtures of these).

In some embodiments, the leaching solution comprises a peroxymonosulfate ion($SO_5^{2-}$) and/or a peroxydisulfate ion ($S_2O_8^{2-}$). The peroxymonosulfate ions and/or peroxydisulfate ions may be present in place of or in addition to a sulfonic acid in the leaching solution (including any of the sulfonic acids mentioned elsewhere herein, and mixtures of these).

According to certain embodiments, the leaching solution comprises sulfamate ions. The sulfamate ions can originate from a number of sources. In some embodiments, at least a portion (e.g., at least about 1 wt %, at least about 5 wt %, at least about 10 wt %, at least about 25 wt %, at least about 50 wt %, at least about 75 wt %, at least about 90 wt %, at least about 95 wt %, at least about 99 wt %, or all) of the sulfamate ions originate from sulfamic acid and/or a sulfamate salt. In certain embodiments, at least a portion (e.g., at least about 1 wt %, at least about 5 wt %, at least about 10 wt %, at least about 25 wt %, at least about 50 wt %, at least about 75 wt %, at least about 90 wt %, at least about 95 wt %, at least about 99 wt %, or all) of the sulfamate ions originate from sulfamic acid. In certain embodiments, at least a portion (e.g., at least about 1 wt %, at least about 5 wt %, at least about 10 wt %, at least about 25 wt %, at least about 50 wt %, at least about 75 wt %, at least about 90 wt %, at least about 95 wt %, at least about 99 wt %, or all) of the sulfamate ions originate from a sulfamate salt. The sulfamate salt may include, for example, sulfamate ions ionically bonded to one or more metal ions. The sulfamate salt may include, for example, ammonium sulfamate, sodium sulfamate, potassium sulfamate, calcium sulfamate, and/or combinations of two or more of these.

In some, although not necessarily all, embodiments, it may be advantageous to use nitric acid as the source of nitrate ions when sulfamate ions are employed in the leaching solution.

In certain embodiments, the total amount of sulfamate ions in the leaching solution is less than or equal to about 10 wt %, less than or equal to about 9 wt %, less than or equal to about 8 wt %, less than or equal to about 7 wt %, less than or equal to about 6 wt %, less than or equal to about 5 wt %, less than or equal to about 4 wt %, less than or equal to about 3 wt %, or less than or equal to about 2 wt % (and/or, in some embodiments, at least about 0.001 wt %, at least about 0.01 wt %, at least about 0.1 wt %, at least about 1 wt %, or at least about 2 wt %).

According to certain embodiments, the leaching solution comprises ammonium. In some, although not necessarily all, embodiments, it may be advantageous to use nitric acid as the source of nitrate ions when ammonium is employed in the leaching solution.

In certain embodiments, the total amount of ammonium in the leaching solution is less than or equal to about 5 wt %, less than or equal to about 4.5 wt %, less than or equal to about 4 wt %, less than or equal to about 3.5 wt %, less than or equal to about 3 wt %, less than or equal to about 2.5 wt %, or less than or equal to about 2 wt % (and/or, in some embodiments, at least about 0.001 wt %, at least about 0.01 wt %, at least about 0.1 wt %, at least about 1 wt %, or at least about 2 wt %).

According to certain embodiments, the leaching solution comprises acetic acid. In some, although not necessarily all, embodiments, it may be advantageous to use nitric acid as the source of nitrate ions when acetic acid is employed in the leaching solution.

In certain embodiments, the total amount of acetic acid in the leaching solution is less than or equal to about 5 wt %, less than or equal to about 4.5 wt %, less than or equal to about 4 wt %, less than or equal to about 3.5 wt %, less than or equal to about 3 wt %, less than or equal to about 2.5 wt %, or less than or equal to about 2 wt % (and/or, in some embodiments, at least about 0.001 wt %, at least about 0.01 wt %, at least about 0.1 wt %, at least about 1 wt %, or at least about 2 wt %).

In some embodiments, noble metal(s) can be recovered from a noble-metal-containing material by exposing the material comprising the noble metal(s) (and, in some embodiments, at least one base metal) to a mixture comprising sulfuric acid and nitrate ions (e.g., nitric acid and/or a source of nitrate ions that is not nitric acid). In some embodiments, noble metal(s) can be recovered from a noble-metal-containing material by exposing the material comprising the noble metal(s) (and, in some embodiments, at least one base metal) to a mixture comprising phosphoric acid and nitrate ions (e.g., nitric acid and/or a source of nitrate ions that is not nitric acid). In some embodiments, noble metal(s) can be recovered from a noble-metal-containing material by exposing the material comprising the noble metal(s) (and, in some embodiments, at least one base metal) to a mixture comprising a sulfonic acid and nitrate ions (e.g., nitric acid and/or a source of nitrate ions that is not nitric acid). In certain embodiments, noble metal(s) can be recovered from a noble-metal-containing material by exposing the material comprising the noble metal(s) (and, in some embodiments, at least one base metal) to a mixture comprising phosphoric acid, sulfuric acid, and nitrate ions (e.g., nitric acid and/or a source of nitrate ions that is not nitric acid). In certain embodiments, noble metal(s) can be recovered from a noble-metal-containing material by exposing the material comprising the noble metal(s) (and, in some embodiments, at least one base metal) to a mixture comprising sulfuric acid, a sulfonic acid (e.g., an alkanesulfonic acid such as methane sulfonic acid), and nitrate ions (e.g., nitric acid and/or a source of nitrate ions that is not nitric acid). In certain embodiments, noble metal(s) can be recovered from a noble-metal-containing material by exposing the material comprising the noble metal(s) (and, in some embodiments, at least one base metal) to a mixture comprising phosphoric acid, a sulfonic acid (e.g., an alkanesulfonic acid such as methane sulfonic acid), and nitrate ions (e.g., nitric acid and/or a source of nitrate ions that is not nitric acid). In some embodiments, noble metal(s) can be recovered from a noble-metal-containing material by exposing the material comprising the noble metal(s) (and, in some embodiments, at least one base metal) to a mixture comprising sulfuric acid, phosphoric acid, a sulfonic acid (e.g., an alkanesulfonic acid such as methane sulfonic acid), and nitrate ions (e.g., nitric acid and/or a source of nitrate ions that is not nitric acid).

The dissolution of noble metal(s) can occur, in some embodiments, while an electric current is transported between an electrode and the noble metal of the noble-metal containing material. Without wishing to be bound by any particular theory, it is believed that applying the electric current in this way can increase the rate at which noble metal(s) are dissolved. In certain embodiments in which electric current is transported between the electrode and the noble metal(s), the noble-metal-containing material can be used as an anode in an electrolytic cell.

In some embodiments, noble metal(s) can be recovered from material containing the noble metal(s) and at least one base metal. In some such embodiments, the noble metal(s) can be recovered (e.g., via dissolution of the noble metal(s)) without substantially dissolving the base metal(s) of the noble-metal-containing material. Base metals are generally non-noble metals (e.g., metals that are not gold, silver, platinum, or palladium). Examples of base metals include, but are not limited to, iron, nickel, lead, zinc, copper, manganese, tin, antimony, and/or aluminum, as well as alloys comprising the same, and combinations thereof. In some embodiments, the base metals include copper, iron, nickel, lead, and/or zinc, and/or alloys comprising the same, and/or combinations thereof.

Certain of the methods described herein can be applied for the recovery of noble metal(s) from types of scrap that are generally difficult to process such as, for example, scrap in which impure noble metal(s) (e.g., alloys of noble metal(s) such as gold and/or silver metals with the base metals) are applied as a coating (e.g., plating, filling) over a substrate made of base metals/base metals alloys. According to certain embodiments, the noble metal(s) can be dissolved and the base metals of the coating can be removed, whereby the coating will be removed from the substrate, but it will not lead to any essential dissolution of the base metals of the substrate.

In some embodiments, the weight ratio of the supplemental acid within the acid mixture to the nitrate ions (e.g., nitric acid and/or a source of nitrate ions that is not nitric acid) within the mixture is relatively high. For example, in some embodiments, the ratio of the weight of the at least one supplemental acid in the mixture to the weight of the nitrate ions in the mixture is at least about 3:1, at least about 4:1, at least about 5:1, at least about 6:1, at least about 7:1, at least about 8:1, at least about 9:1, at least about 10:1, at least about 11:1, at least about 12:1, at least about 13:1, at least about 14:1, at least about 15:1, or at least about 17:1 (and/or, in certain embodiments, up to about 20:1, up to about 50:1, up to about 100:1, or more). When more than one supplemental acid is present, the ratio of the weight of the at least one supplemental acid to the weight of the nitrate ions is calculated by adding the weights of all supplemental acids within the mixture together, and comparing this number to the weight of the nitrate ions within the mixture. In some embodiments, the ratio of the combined weights of sulfuric acid and phosphoric acid in the mixture to the weight of the nitrate ions in the mixture is at least about 3:1, at least about 4:1, at least about 5:1, at least about 6:1, at least about 7:1, at least about 8:1, at least about 9:1, at least about 10:1, at least about 11:1, at least about 12:1, at least about 13:1, at least about 14:1, at least about 15:1, or at least about 17:1 (and/or, in certain embodiments, up to about 20:1, up to about 50:1, up to about 100:1, or more).

In certain embodiments, the weight ratio of sulfuric acid to nitrate ions (e.g., nitric acid and/or a source of nitrate ions that is not nitric acid) in the mixture used to recover the noble metal(s) is relatively high. Such relatively high weight ratios can be employed, in certain embodiments, when electrical current is transported between the noble-metal-containing material and another electrode within the system, which can result in the electrolytic removal of noble metal(s) from the noble-metal-containing material. In some such embodiments, the weight ratio of sulfuric acid to nitrate ions within the mixture is at least about 12:1, at least about 13:1, at least about 14:1, at least about 15:1, or at least about 17:1 (and/or, in certain embodiments, up to about 20:1, up to about 50:1, up to about 100:1, or more). For example, in one set of embodiments, the leaching solution includes 90 wt % or more of concentrated sulfuric acid (e.g., at least 95 wt % sulfuric acid, such as 95-98 wt % sulfuric acid, the balance of which may be, for example, water) and 10 wt % or less of concentrated nitric acid (e.g., at least 68 wt % nitric acid, such as 68-70 wt % nitric acid, the balance of which may be, for example, water).

In certain embodiments, the weight ratio of phosphoric acid to nitrate ions (e.g., nitric acid and/or a source of nitrate ions that is not nitric acid) in the mixture is relatively high. Such relatively high weight ratios can be employed, for example, when electrical current is transported between the noble-metal-containing material and another electrode within the system, which can result in the electrolytic removal of noble metal(s) from the noble-metal-containing material. For example, in some embodiments, the weight ratio of phosphoric acid to nitrate ions within the mixture is at least about 11:1, at least about 12:1, at least about 13:1, at least about 14:1, at least about 15:1, or at least about 17:1 (and/or, in certain embodiments, up to about 20:1, up to about 50:1, up to about 100:1,or more). In one set of embodiments, the leaching solution includes 90 wt % or more of concentrated phosphoric acid (e.g., 85 wt % phosphoric acid or stronger, the balance of which may be, for example, water) and 10 wt % or less of concentrated nitric acid (e.g., at least 68 wt % nitric acid, such as 68-70 wt % nitric acid, the balance of which may be, for example, water).

Not wishing to be bound by any particular theory, it is believed that the use of nitrate ions (e.g., nitric acid and/or a source of nitrate ions that is not nitric acid) in amounts greater than those described above can, in certain cases, lead to the formation of $NO_x$ compounds in the bath, especially when, for example, the noble-metal-containing material is being used as part of an electrolytic cell during removal of noble metal(s). In addition, it is believed that the use of nitrate ions in amounts greater than those described above can, in certain cases, cause overheating of the solution and/or rapid dissolution of base metals of the substrate, which one may desire to avoid.

In certain embodiments, an oxidant can be used (in place of, or in addition to, the nitrate ions) to recover noble metal(s) from the noble-metal-containing material. For example, some embodiments comprise exposing the noble-metal-containing material to a fluid comprising an oxidant having the ability to dissolve noble metal(s). In some such embodiments, the amount of the oxidant within the fluid is less than or equal to about 10 wt %, less than or equal to about 9 wt %, less than or equal to about 8 wt %, less than or equal to about 7 wt %, less than or equal to about 6 wt %, or less than or equal to about 5 wt % (and/or, in some embodiments, as little as about 4 wt %, as little as about 3 wt %, at little as about 2 wt %, as little as about 1 wt %, or less). A variety of such oxidants may be used. In some embodiments, an oxidant with the ability to dissolve noble metal(s) is selected for use. In some embodiments, the oxidant can be in the form of a soluble salt. In certain embodiments, the soluble salt comprises an oxide of manganese, nickel, lead, and/or chromium. One non-limiting example of an oxidant that may be used is manganese dioxide ($MnO_2$). In some embodiments, the mixture comprises the oxidant (e.g., $MnO_2$) and at least one supplemental acid (e.g., phosphoric acid and/or sulfuric acid). For example, in some embodiments, mixtures comprising an oxidant (e.g., $MnO_2$) and sulfuric acid and/or phosphoric acid may be used to recover noble metal(s). Any of the supplemental acids described elsewhere herein can, according to certain embodiments, be used in combination with the oxidant. In some embodiments, the oxidant is capable of producing oxygen by reacting with the supplemental acid (e.g., phosphoric acid and/or sulfuric acid). For example, when manganese oxide and sulfuric acid are used, manganese oxide can react with sulfuric acid to produce manganese sulfate ($MnSO_4$), oxygen gas ($O_2$), and water.

The mixtures described herein that are used to recover noble metal(s) (which can include for example one or more acids and/or one or more oxidants, as described above) are also sometimes referred to herein as "leaching solutions."

In some embodiments, the amount of water contained in the leaching solution is relatively low. For example, some embodiments comprise exposing the noble-metal-containing material to a mixture comprising nitrate ions (e.g., nitric acid and/or a source of nitrate ions that is not nitric acid) and water, wherein the amount of water within the mixture is less than or equal to about 17 wt % (or less than about 16 wt %, less than about 15 wt %, less than about 14 wt %, less than about 13 wt %, less than about 12 wt %, less than about 11 wt %, less than about 10 wt %, less than about 9 wt %, less than about 8 wt %, less than about 7 wt %, less than about 6 wt %, less than about 5 wt %, less than about 4 wt %, less than about 3 wt %, less than about 2 wt %, or less than about 1 wt %). In certain embodiments, as described above, the mixture comprises supplemental acids, such as phosphoric acid and/or sulfuric acid.

In certain embodiments, the leaching solution mixture comprises sulfuric acid, and the amount of water within the mixture is less than about 8 wt % (or less than about 7 wt %, less than about 6 wt %, less than about 5 wt %, less than about 4 wt %, less than about 3 wt %, less than about 2 wt %, or less than about 1 wt %).

For example, in some embodiments, the leaching solution contains a mixture of sulfuric acid and nitrate ions (e.g., nitric acid and/or a source of nitrate ions that is not nitric acid), and the amount of water within the mixture is less than about 8 wt % (or less than about 7 wt %, less than about 6 wt %, less than about 5 wt %, less than about 4 wt %, less than about 3 wt %, less than about 2 wt %, or less than about 1 wt %). In certain embodiments, the leaching solution contains a mixture of phosphoric acid and nitrate ions (e.g., nitric acid and/or a source of nitrate ions that is not nitric acid), and the amount of water within the mixture is less than about 17 wt % (or less than about 16 wt %, less than about 15 wt %, less than about 14 wt %, less than about 13 wt %, less than about 12 wt %, less than about 11 wt %, less than about 10 wt %, less than about 9 wt %, less than about 8 wt %, less than about 7 wt %, less than about 6 wt %, less than about 5 wt %, less than about 4 wt %, less than about 3 wt %, less than about 2 wt %, or less than about 1 wt %).

Without wishing to be bound by any particular theory, it is believed that the use of highly concentrated acids (as well as relatively low concentrations of nitrate ions) in the leaching solution allows for the selective dissolution of noble metal(s) from the noble-metal-containing material. In some embodiments, the leaching solution contains nitrate ions (e.g., in any of the amounts described above) and a relatively large amount of at least one supplemental acid. In some embodiments, the leaching solution contains supplemental acid in an amount of at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, at least about 97 wt %, or at least about 98 wt %. In some embodiments, the leaching solution contains supplemental acid in an amount of less than or equal to about 99 wt %, less than or equal to about 98 wt %, less than or equal to about 95 wt %, less than or equal to about 90 wt %, less than or equal to about 85 wt %, less than or equal to about 80 wt %, or less than or equal to about 75 wt %. When more than one supplemental acid is present in a leaching solution, the weight percentage of the supplemental acid in the leaching solution is calculated by summing the weight percentages of each supplemental acid in the leaching solution. For example, if the leaching solution contains 85 wt % sulfuric acid and 5 wt % phosphoric acid, the leaching solution would be said to contain 90 wt % supplemental acids.

In some embodiments, the leaching solution contains sulfuric acid in an amount of at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, at least about 97 wt %, or at least about 98 wt %. In some embodiments, the leaching solution contains sulfuric acid in an amount of less than or equal to about 99 wt %, less than or equal to about 98 wt %, less than or equal to about 95 wt %, less than or equal to about 90 wt %, less than or equal to about 85 wt %, less than or equal to about 80 wt %, or less than or equal to about 75 wt %. In some embodiments, the leaching solution contains phosphoric acid in an amount of at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, at least about 97 wt %, or at least about 98 wt %. In some embodiments, the leaching solution contains phosphoric acid in an amount of less than or equal to about 99 wt %, less than or equal to about 98 wt %, less than or equal to about 95 wt %, less than or equal to about 90 wt %, less than or equal to about 85 wt %, less than or equal to about 80 wt %, or less than or equal to about 75 wt %.

In certain embodiments, the total amount of sulfonic acids (e.g., methanesulfonic acid and/or any other sulfonic acid, alone or in combination) in the leaching solution is at least about 50 wt %, at least about 55 wt %, at least about 60 wt %, at least about 65 wt %, at least about 75 wt %, at least about 80 wt %, at least about 85 wt %, at least about 90 wt %, at least about 95 wt %, at least about 97 wt %, or at least about 98 wt %. In some embodiments, the total amount of sulfonic acids (e.g., methanesulfonic acid and/or any other sulfonic acid, alone or in combination) in the leaching solution is less than or equal to about 99 wt %, less than or equal to about 98 wt %, less than or equal to about 95 wt %, less than or equal to about 90 wt %, or less than or equal to about 85 wt %. In some such embodiments in which the concentration of sulfonic acid(s) is relatively high, the sulfonic acid(s) can be used as the main supplemental acid in the leaching solution mixture. In some embodiments, lower amounts of sulfonic acid(s) can be used. For example, in some embodiments, the total amount of sulfonic acids (e.g., methanesulfonic acid and/or any other sulfonic acid, alone or in combination) in the leaching solution is less than about 25 wt %, less than about 24 wt %, less than about 23 wt %, less than about 22 wt %, less than about 21 wt %, less than about 20 wt %, less than about 15 wt %, or less than about 10 wt % (and/or, in some embodiments, as little as about 5 wt %, as little as about 2 wt %, as little as about 1 wt %, as little as about 0.1 wt %, or less). In some embodiments, the total amount of sulfonic acid(s) in the leaching solution is less than about 25 wt % (or less than about 24 wt %, less than about 23 wt %, less than about 22 wt %, less than about 21 wt %, less than about 20 wt %, less than about 15 wt %, less than about 10 wt % and/or as little as about 5 wt %, as little as about 2 wt %, as little as about 1 wt %, as little as about 0.1 wt %, or less) when the sulfonic acid is used in combination with nitrate ions (e.g., in any of the amounts described elsewhere herein) and at least one additional supplemental acid (e.g., sulfuric acid and/or phosphoric acid, for example, in any of the amounts described elsewhere herein).

In certain embodiments, the total amount of alkanesulfonic acids in the leaching solution is at least about 50 wt %, at least about 75 wt %, at least about 80 wt %, at least about 85 wt %, at least about 90 wt %, at least about 95 wt %, at least about 97 wt %, or at least about 98 wt %. In some embodiments, the total amount of alkanesulfonic acids in the leaching solution is less than or equal to about 99 wt %, less than or equal to about 98 wt %, less than or equal to about 95 wt %, less than or equal to about 90 wt %, or less than or equal to about 85 wt %. In some embodiments, lower amounts of alkanesulfonic acid(s) can be used. For example, in some embodiments, the total amount of alkanesulfonic acids in the leaching solution is less than about 25 wt %, less than about 24 wt %, less than about 23 wt %, less than about 22 wt %, less than about 21 wt %, less than about 20 wt %, less than about 15 wt %, or less than about 10 wt % (and/or, in some embodiments, as little as about 5 wt %, as little as about 2 wt %, as little as about 1 wt %, as little as about 0.1 wt %, or less). In some embodiments, the total amount of alkanesulfonic acid(s) in the leaching solution is less than about 25 wt % (or less than about 24 wt %, less than about 23 wt %, less than about 22 wt %, less than about 21 wt %, less than about 20 wt %, less than about 15 wt %, less than about 10 wt % and/or as little as about 5 wt %, as little as about 2 wt %, as little as about 1 wt %, as little as about 0.1 wt %, or less) when the alkanesulfonic acid is used in combination with nitrate ions (e.g., in any of the amounts described elsewhere herein) and at least one additional supplemental acid (e.g., sulfuric acid and/or phosphoric acid, for example, in any of the amounts described elsewhere herein).

In certain embodiments, the total amount of methanesulfonic acid in the leaching solution is at least about 50 wt %, at least about 75 wt %, at least about 80 wt %, at least about 85 wt %, at least about 90 wt %, at least about 95 wt %, at least about 97 wt %, or at least about 98 wt %. In some embodiments, the total amount of methanesulfonic acid in the leaching solution is less than or equal to about 99 wt %, less than or equal to about 98 wt %, less than or equal to about 95 wt %, less than or equal to about 90 wt %, or less than or equal to about 85 wt %. In some embodiments, lower amounts of methanesulfonic acid can be used. For example, in some embodiments, the total amount of methanesulfonic acid in the leaching solution is less than about 25 wt %, less than about 24 wt %, less than about 23 wt %, less than about 22 wt %, less than about 21 wt %, less than about 20 wt %, less than about 15 wt %, or less than about 10 wt % (and/or, in some embodiments, as little as about 5 wt %, as little as about 2 wt %, as little as about 1 wt %, as little as about 0.1 wt %, or less). In some embodiments, the total amount of methanesulfonic acid in the leaching solution is less than about 25 wt % (or less than about 24 wt %, less than about 23 wt %, less than about 22 wt %, less than about 21 wt %, less than about 20 wt %, less than about 15 wt %, less than about 10 wt % and/or as little as about 5 wt %, as little as about 2 wt %, as little as about 1 wt %, as little as about 0.1 wt %, or less) when the methanesulfonic acid is used in combination with nitrate ions (e.g., in any of the amounts described elsewhere herein) and at least one additional supplemental acid (e.g., sulfuric acid and/or phosphoric acid, for example, in any of the amounts described elsewhere herein).

In certain embodiments, the leaching solution comprises nitrate ions (e.g., nitric acid and/or a source of nitrate ions that is not nitric acid), at least one sulfonic acid, and at least one additional (non-sulfonic) supplemental acid (e.g., sulfuric acid and/or phosphoric acid). In some such embodiments, the amount of nitrate ions within the mixture is less than or equal to about 10 wt %, less than or equal to about 9 wt %, less than or equal to about 8 wt %, less than or equal to about 7 wt %, less than or equal to about 6 wt %, less than or equal to about 5 wt %, less than or equal to about 4 wt %, less than or equal to about 3 wt %, less than or equal to about 2 wt %, less than or equal to about 1 wt %, or less, and/or as little as about 4 wt %, as little as about 3 wt %, at little as about 2 wt %, as little as about 1 wt %, as little as about 0.5 wt %, as little as about 0.1 wt %, as little as about 0.07 wt %, as little as about 0.05 wt %, at little as about 0.02 wt %, as little as about 0.01 wt %, or less. In some such embodiments, the total amount of sulfonic acids (e.g., methanesulfonic acid and/or any other sulfonic acid, alone or in combination) in the leaching solution is less than about 25 wt %, less than about 24 wt %, less than about 23 wt %, less than about 22 wt %, less than about 21 wt %, less than about 20 wt %, less than about 15 wt %, or less than about 10 wt % (and/or, in some embodiments, as little as about 5 wt %, as little as about 2 wt %, as little as about 1 wt %, as little as about 0.1 wt %, or less). In some embodiments, the total amount of the at least one additional (non-sulfonic) supplemental acid is at least about 50 wt %, at least about 65 wt %, at least about 70 wt %, at least about 75 wt %, at least about 80 wt %, at least about 85 wt %, at least about 90 wt %, at least about 95 wt %, at least about 97 wt %, at least about 98 wt %, and/or less than or equal to about 99 wt %, less than or equal to about 98 wt %, less than or equal to about 95 wt %, less than or equal to about 90 wt %, less than or equal to about 85 wt %, less than or equal to about 80 wt %, or less than or equal to about 75 wt %.

In some embodiments, the ratio of the amount of noble metal(s) dissolved from the noble-metal-containing material can be relatively large compared to the amount of base material dissolved from the noble-metal-containing material. That is to say, the leaching solution can, in some embodiments, selectively dissolve noble metal(s), relative to non-noble metal(s). For example, in some embodiments, the weight ratio of the amount of gold dissolved from the noble-metal-containing material to the amount of base metal(s) dissolved from the noble-metal-containing material can be at least about 5:1, at least about 10:1, at least about 25:1, at least about 50:1, at least about 100:1 (and/or, in some embodiments, up to 1000:1, up to 10,000:1, or greater). In some embodiments, the weight ratio of the amount of silver dissolved from the noble-metal-containing material to the amount of base metal(s) dissolved from the noble-metal-containing material can be at least about 5:1, at least about 10:1, at least about 25:1, at least about 50:1, at least about 100:1 (and/or, in some embodiments, up to 1000:1, up to 10,000:1, or greater). In some embodiments, the weight ratio of the amount of palladium dissolved from the noble-metal-containing material to the amount of base metal(s) dissolved from the noble-metal-containing material can be at least about 5:1, at least about 10:1, at least about 25:1, at least about 50:1, at least about 100:1 (and/or, in some embodiments, up to 1000:1, up to 10,000:1, or greater). In some embodiments, the weight ratio of the amount of platinum dissolved from the noble-metal-containing material to the amount of base metal(s) dissolved from the noble-metal-containing material can be at least about 5:1, at least about 10:1, at least about 25:1, at least about 50:1, at least about 100:1 (and/or, in some embodiments, up to 1000:1, up to 10,000:1, or greater). In some embodiments, the weight ratio of the combined amount of gold and silver dissolved from the noble-metal-containing material to the amount of base metal(s) dissolved from the noble-metal-containing material can be at least about 5:1, at least about 10:1, at least about 25:1, at least about 50:1, at least about 100:1 (and/or, in some embodiments, up to 1000:1, up to 10,000:1, or greater). In some embodiments, the weight ratio of the amount of non-gold, non-silver noble metal(s) dissolved from the noble-metal-containing material to the amount of base metal(s) dissolved from the noble-metal-containing material can be at least about 5:1, at least about 10:1, at least about 25:1, at least about 50:1, at least about 100:1 (and/or, in some embodiments, up to 1000:1, up to 10,000:1, or greater). In some embodiments, the weight ratio of the combined amount of platinum and palladium dissolved from the noble-metal-containing material to the amount of base metal(s) dissolved from the noble-metal-containing material can be at least about 5:1, at least about 10:1, at least about 25:1, at least about 50:1, at least about 100:1 (and/or, in some embodiments, up to 1000:1, up to 10,000:1, or greater). In some embodiments, the weight ratio of the combined amount of gold, silver, platinum, and palladium dissolved from the noble-metal-containing material to the amount of base metal(s) dissolved from the noble-metal-containing material can be at least about 5:1, at least about 10:1, at least about 25:1, at least about 50:1, at least about 100:1 (and/or, in some embodiments, up to 1000:1, up to 10,000:1, or greater).

Figure 6A:
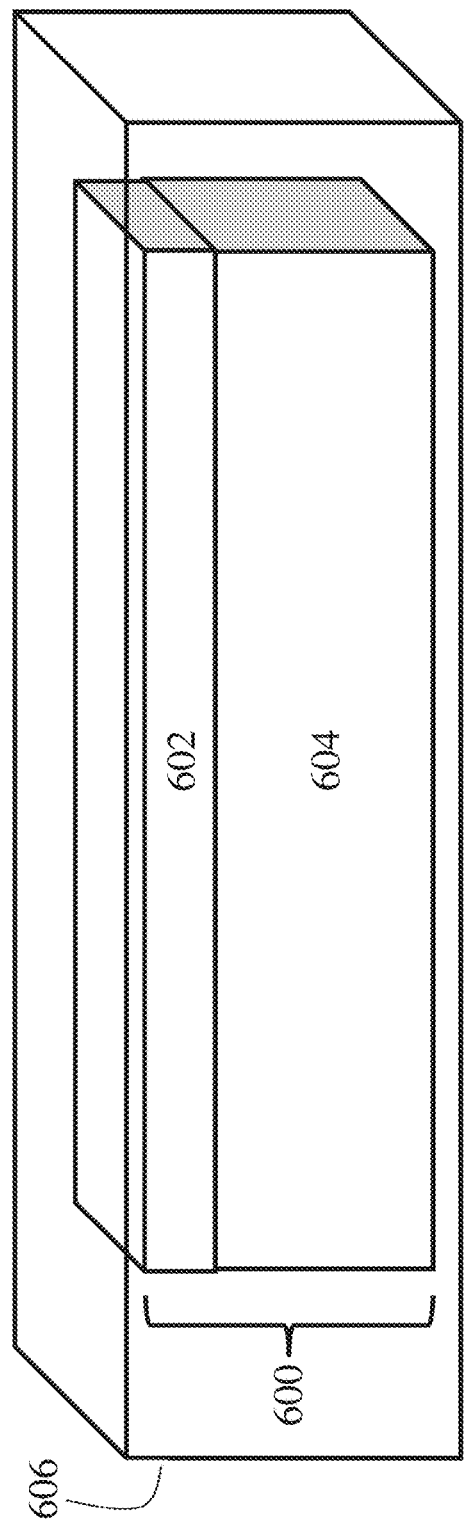
FIGS. 6A-6B are schematic illustrations showing the dissolution of a coating material, according to certain embodiments.
Figure 6B:
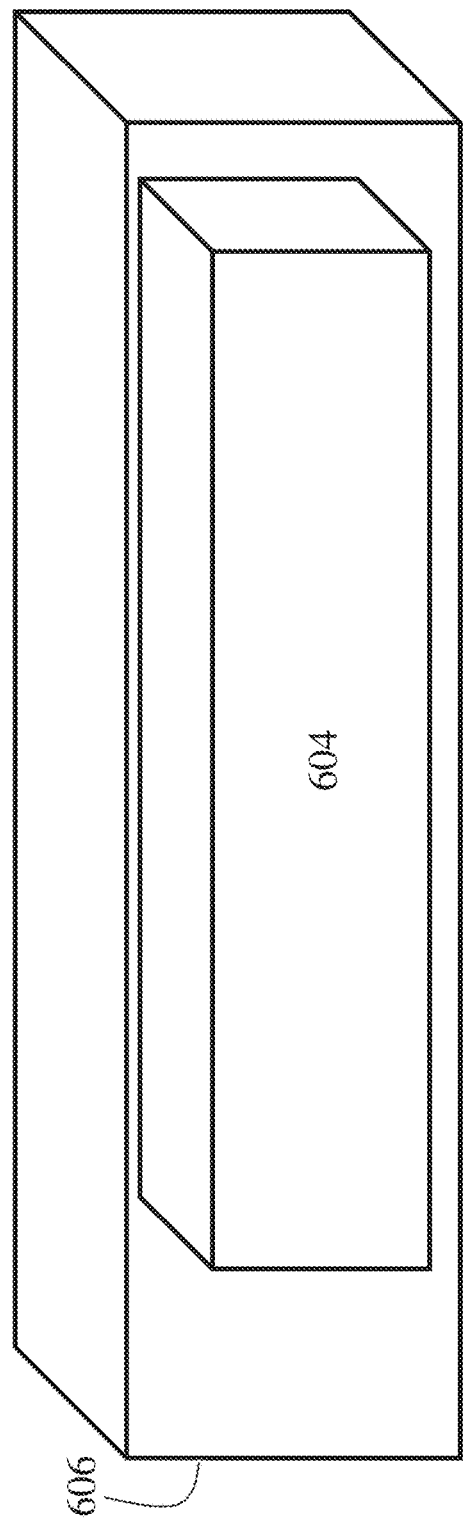

In some embodiments, the noble-metal-containing material comprises a coating comprising noble metal(s) over a substrate material comprising at least one base metal. For example, referring to FIG. 6A, noble-metal-containing material 600 comprises coating 602 (which may contain noble metal(s), and, in some embodiments, additional metals) and substrate 604 (which can include at least one base metal). The noble metal(s) within noble-metal-containing material 600 can be removed by exposing noble-metal-containing material 600 to any of the acidic mixtures described herein (e.g., within leaching container 606). In some such embodiments, the mixture comprising sulfuric acid and nitrate ions (e.g., nitric acid and/or a source of nitrate ions that is not nitric acid), or comprising phosphoric acid and nitrate ions, or comprising a sulfonic acid and nitrate ions (optionally in combination with other supplemental acid(s)) dissolves at least a portion of the noble metal(s) such that the ratio of the mass of the coating that is dissolved to the mass of the substrate material that is dissolved is at least about 5:1, at least about 10:1, at least about 25:1, at least about 50:1, or at least about 100:1 (and/or, in some embodiments, up to 1000:1, up to 10,000:1, or greater). Referring to FIG. 6B, for example, after noble-metal-containing material 600 has been processed, according to certain embodiments, the material within coating 602 is dissolved into the leaching solution, and substrate material 604 remains substantially undissolved.

In some embodiments, the noble-metal-containing material comprises a plating comprising noble metal(s) and a substrate comprising at least one base metal. In some such embodiments, the leaching solution (e.g., any of the leaching solutions mentioned above) dissolves the noble metal(s) such that the ratio of the mass of the plating that is dissolved to the mass of the substrate material that is dissolved is at least about 5:1, at least about 10:1, at least about 25:1, at least about 50:1, or at least about 100:1 (and/or, in some embodiments, up to 1000:1, up to 10,000:1, or greater). In some embodiments, the noble-metal-containing material comprises a filling comprising noble metal(s) and a substrate comprising at least one base metal. In some such embodiments, the leaching solution (e.g., any of the leaching solutions mentioned above) dissolves the noble metal(s) such that the ratio of the mass of the filling that is dissolved to the mass of the substrate material that is dissolved is at least about 5:1, at least about 10:1, at least about 25:1, at least about 50:1, or at least about 100:1 (and/or, in some embodiments, up to 1000:1, up to 10,000:1, or greater).

Not wishing to be bound by any particular theory, it is believed that the selectivity of removal of noble metal(s) relative to the base metal(s) is achieved due to the use of relatively concentrated supplemental acids (and concentrations of nitrate ions (e.g., nitric acid and/or a source of nitrate ions that is not nitric acid) that are sufficiently low to inhibit the formation of $NO_x$ compounds) as components of the leaching solution. It is believed that, in certain cases, the base metals may be passivated by the concentrated acids (e.g., via the formation of a base metal oxide), while noble metal(s) are dissolved in the mixture.

Surprisingly, according to certain embodiments, the base metals which are alloyed with noble metal(s), are still dissolved in the leaching solution, at the same time the base metals of the substrate are substantially preserved. For example, in some embodiments, a material containing a silver and cadmium oxide coating over a copper base material can be exposed to the acid mixture. In some such embodiments, cadmium and silver are dissolved in the leaching solution while the copper base material is not substantially dissolved. As another example, in some karat gold filled items, 40% of Au is alloyed with 60% of base metals (e.g., Cu, Ni, Fe, etc.) and applied over Cu—Zn substrate. In certain embodiments, exposing these articles to certain of the acid mixtures described herein results in the dissolution of the gold and base metals in the coating, but does not result in the dissolution of the Cu—Zn substrate.

According to certain embodiments in which the noble-metal-containing material is used as part of an electrolytic cell, the use of the above mentioned proportions of the concentrated acids has led to the unexpected discovery that the noble metal(s) as well as the base metals of the coating (e.g., base metals of the karat gold filling, cadmium of the silver-cadmium oxide coating, etc.) are dissolved in the leaching solution, but as soon as the dissolution of the coating is finished, the base metal substrate does not substantially dissolve in the solution, and the electric current in the cell drops down to substantially zero. In some such embodiments, the noble metal(s) can be dissolved in the leaching solution and subsequently recovered, while the base metal substrate is not substantially damaged by the process (and can therefore be recovered separately).

The noble metal(s) that are recovered can be at least partially separated from the base metal(s) material, for example, in metallic form. In some embodiments, the noble metal(s) that is recovered from the process is recovered in high purity (e.g., having a purity of at least about 90 wt %, at least about 95 wt %, at least about 99 wt %, or at least about 99.9 wt %, relative to non-noble metal metals).

According to certain embodiments, gold metal (e.g., high purity gold metal) can be recovered from the leaching solution, in which gold, optionally silver, optionally palladium, optionally platinum, and optionally some amount of base metal(s) have been dissolved. In some embodiments, separation of gold from the rest of metal(s) occurs by diluting the leaching solution (containing concentrated acids) with water. In some embodiments, gold can be recovered from a gold-containing solution by combining water and the gold-containing solution to form a mixture, such that solid gold is precipitated within the mixture. For example, in some embodiments, when the solution is mixed with the excess amount of water, silver and/or base metal(s) remain dissolved, while gold is precipitated (e.g., in the form of pure or substantially pure metal powder). According to some embodiments, the gold may be separated from the dilute leaching solution and from the rest of metals, for example, via filtration. In some embodiments in which gold removal is performed by passing electrical current through the noble-metal-containing material, gold can be at least partially precipitated on a cathode through which the current is transported.

In certain embodiments in which silver is present (either in combination with gold, platinum, and/or palladium, or on its own), the silver may be recovered, for example, by any of a number of methods, including, but not limited to, addition of chloride ions, addition of a reducing agent, addition of a base, electrowinning, or cementation. In certain embodiments, silver may be recovered via the cementation of silver with copper. In some embodiments, dissolved silver may be precipitated (e.g., as elemental silver and/or as a solid silver salt). In some such embodiments, the precipitated silver may be at least partially separated from the leaching solution and/or other metals. For example, the precipitated silver may be filtered from the leaching solution and/or from other metals. In certain embodiments, a formate salt (e.g. sodium formate), can be used as reducing agent. In some embodiments, a base (e.g. sodium hydroxide) can be added to the solution. Addition of the base can cause formation of a silver-containing solid (e.g., in the form of silver oxide). In some embodiments, the silver-containing solid (e.g., silver oxide), can be recovered and the silver within the silver-containing solid can be at least partially extracted (e.g., via smelting). In some embodiments in which silver is at least partially dissolved from silver-containing material using electrical current, silver can be recovered on a cathode through which the electric current is transported.

In some embodiments, silver can be precipitated by adding chloride ions (e.g., by adding hydrochloric acid, sodium chloride, or any other suitable source of chloride ions). In some such embodiments, the silver can be precipitated as silver chloride. In some such embodiments, the solid silver chloride can be at least partially separated from other dissolved metals that do not form a solid compound with chloride ions (e.g. cadmium). According to certain embodiments, silver chloride can be further transformed to silver metal using any of a variety of methods (e.g., by addition of hydroxide and/or glucose or by interaction with sodium borohydride).

Silver may also be selectively precipitated as silver metal using other methods. For example, in some embodiments, silver metal can be precipitated by adding sodium formate at increased pH (e.g., a pH of between about 1.5 and about 4), which can produce high purity silver. In some embodiments, silver metal can be precipitated by adding a reducing agent. For example, reducing agents such as hydrazine, hydroquinone, and/or ascorbic acid, can be added to the solution of dissolved silver.

It is noted that, in many conventional operations, the dilution of the concentrated acids with water is a very dangerous process, in which $NO_x$ compounds and/or large amounts of hot corrosive acid vapor are generated. It has been discovered that the dilution of acids in accordance with certain embodiments described herein can be accomplished safely without generation of dangerous vapors and gases, when the loaded leaching solution is slowly added to the excess amount of deionized (DI) water. In some embodiments, the weight proportion of water to concentrated acid solution can be 3:1 or higher (and, in some embodiments, may be from 3:1 to below 5:1). In certain embodiments, the weight proportion of water to concentrated acid solution can be 5:1 or higher (and, in some embodiments, may be from 5:1 to below 10:1). In certain embodiments, the weight proportion of water to concentrated acid solution can be 10:1 or higher. According to certain embodiments, the concentrated acid solution is rapidly stirred in the excess volume of water as it is added. As a result of this operation, gold can be precipitated in the form of a substantially pure metal powder and can be recovered from the solution, for example, using any type of solid-liquid separation technique. Subsequently, scrap copper can be added to the leaching solution, and silver can be recovered by galvanic displacement (cementation).

Certain of the methods described herein may be used to recover silver from material comprising silver and cadmium oxide. For example, in some embodiments, silver is recovered by exposing a material comprising silver and cadmium oxide to a mixture (e.g., any of the mixtures described herein, such as a mixture comprising sulfuric acid and nitrate ions, to a mixture comprising phosphoric acid and nitrate ions, or any of the other mixtures described herein) such that the silver is dissolved by the mixture. In some embodiments, the material from which the silver is recovered comprises silver and cadmium oxide (e.g., a Ag—CdO alloy) coated or otherwise positioned over a copper base material. Such materials are often used, for example, in relay contacts, switches, profiles, contact tips, and the like. In some embodiments, the silver-cadmium oxide material is dissolved in the leaching solution, the silver is separately recovered, and the copper base is not substantially corroded by the leaching solution. In such a way, the silver-cadmium oxide on copper base material, which generally cannot be easily recycled by conventional methods such as smelting (e.g., due to the dangers caused by melting of cadmium), can be recycled relatively easily.

In some embodiments, silver can be recovered from material containing silver and tungsten. For example, in some embodiments, silver is recovered by exposing a material comprising the silver and tungsten to a mixture (e.g., any of the mixtures described herein, such as a mixture comprising sulfuric acid and nitrate ions, to a mixture comprising phosphoric acid and nitrate ions, or any of the other mixtures described herein) such that the silver is dissolved by the mixture. In the past, the recovery of silver from scrap and/or other materials containing silver and tungsten has generally not been commercially feasible using conventional methods such as smelting because of very high melting temperature of tungsten. In addition, the use of conventional leaching solutions for dissolving silver (such as, for example, solutions containing 50 wt % or 50 vol % nitric acid) may lead to the oxidation of tungsten and the formation of tungsten oxide. In addition, in such methods large amounts of nitric acid can be consumed for the oxidation of tungsten, and silver is generally not dissolved entirely. Surprisingly, the leaching solution formulated according to certain of the embodiments described herein does not lead to the oxidation of tungsten. In addition, in some embodiments, silver is selectively dissolved and recovered from the solution, leaving behind the tungsten residue.

Certain embodiments relate to inventive systems and apparatus used to recover noble metal(s) from noble-metal-containing material. In some embodiments, the system comprises a rotatable container made of an electrically insulating and/or an electrically conductive material positioned within a vessel. The vessel may be, in certain embodiments, configured to contain a liquid having a pH of less than about 2 (or less than about 1, less than about 0.5, or less than about 0).

In some such embodiments, the system comprises an electrically conductive pathway, for example, from a source of an electrical current to the interior of the rotatable container. In some embodiments, the electrically conductive pathway may be configured such that, when the noble-metal-containing material is contained within the rotatable container, the electrically conductive pathway remains in electrical communication with the noble-metal-containing material when the container is rotated.

Figure 8:
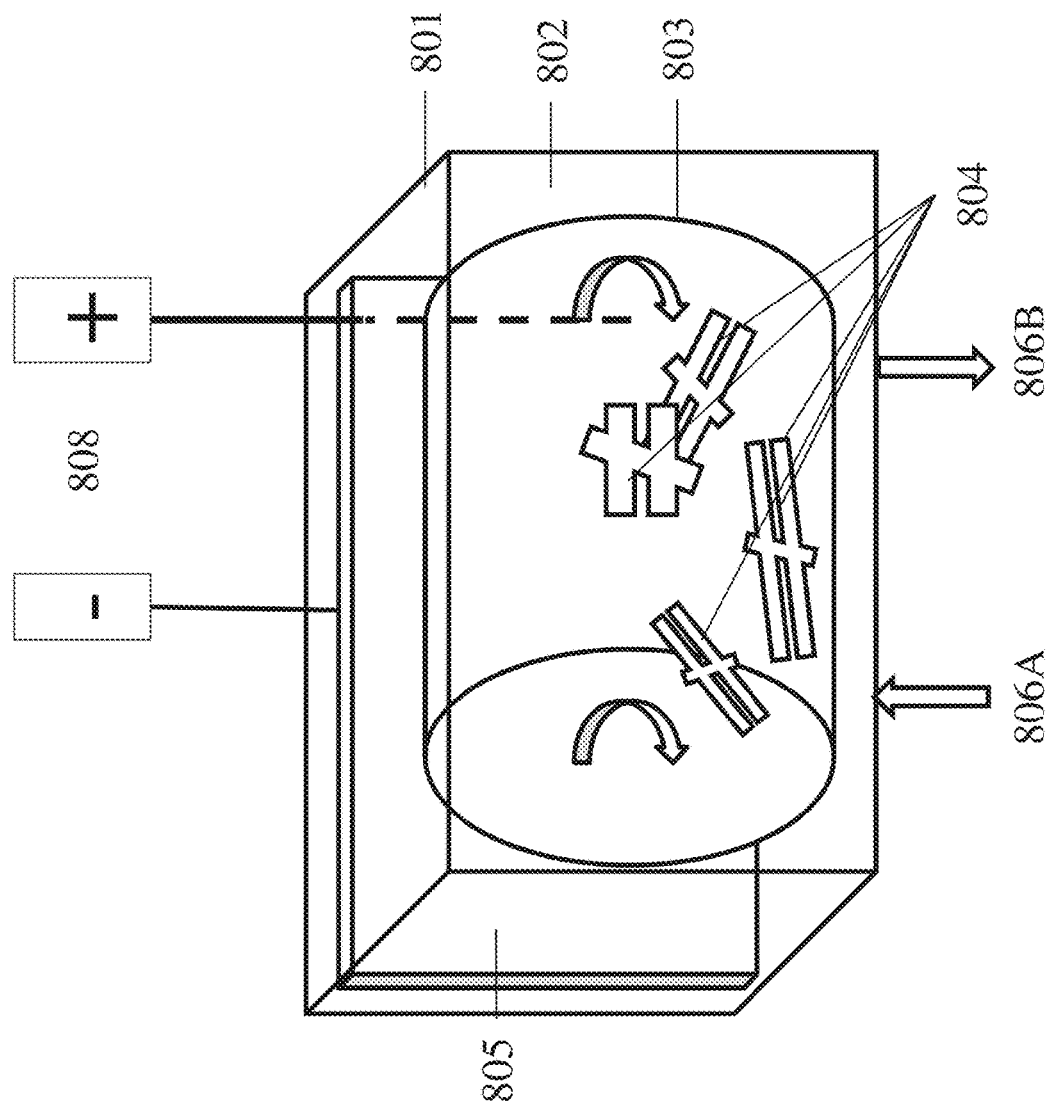
Figure 9:
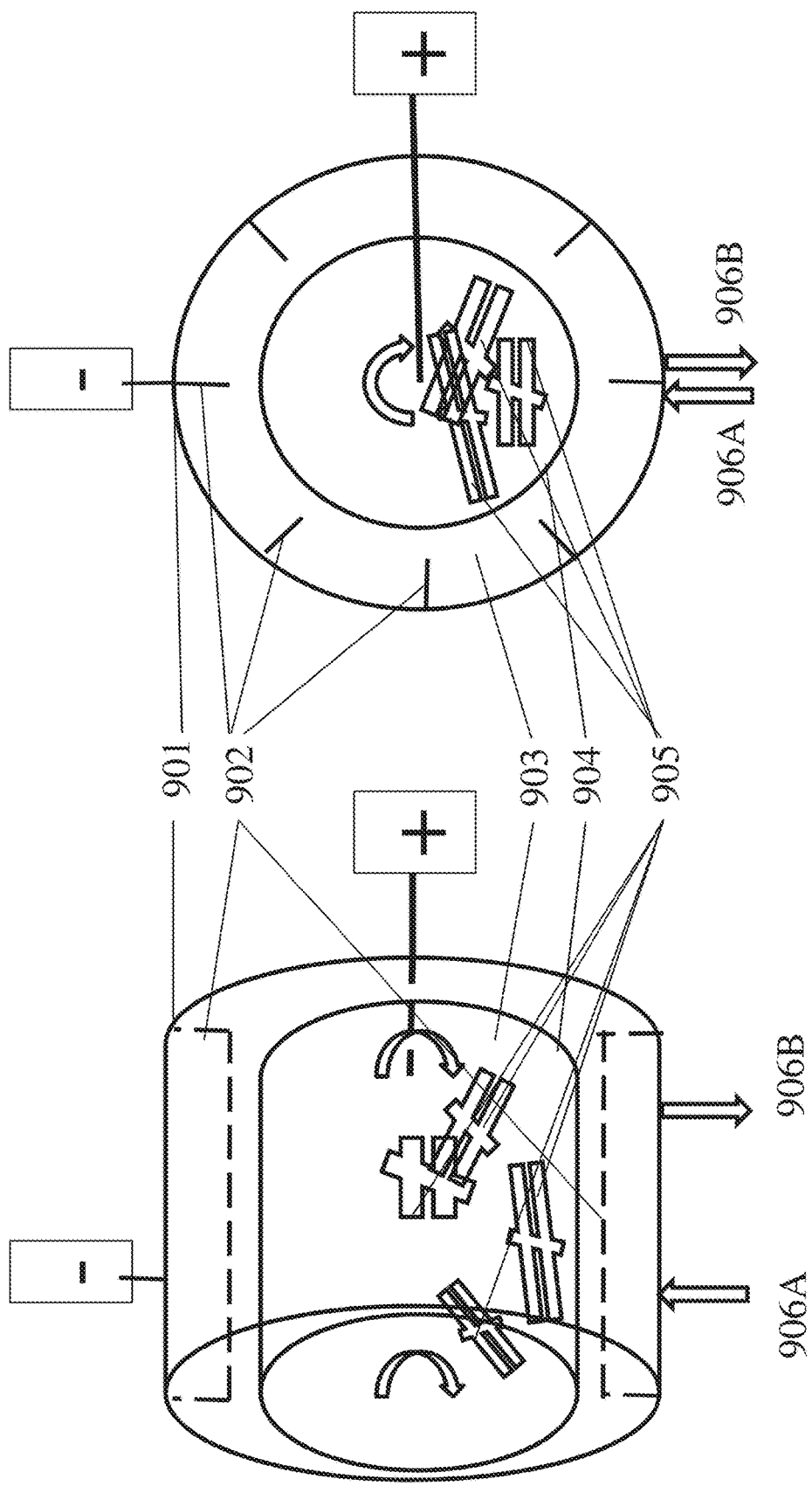

In some embodiments, the electrically conductive pathway can be in contact with an electrically conductive rotatable container, and electricity can be transported through the pathway, through the electrically conductive rotatable container, to the noble-metal-containing material (and, in particular, the noble metal(s) within the noble-metal-containing material) as the rotatable container is rotated. Non-limiting examples of systems in which such arrangements are used are shown in FIGS. 8-9.

Figure 7:
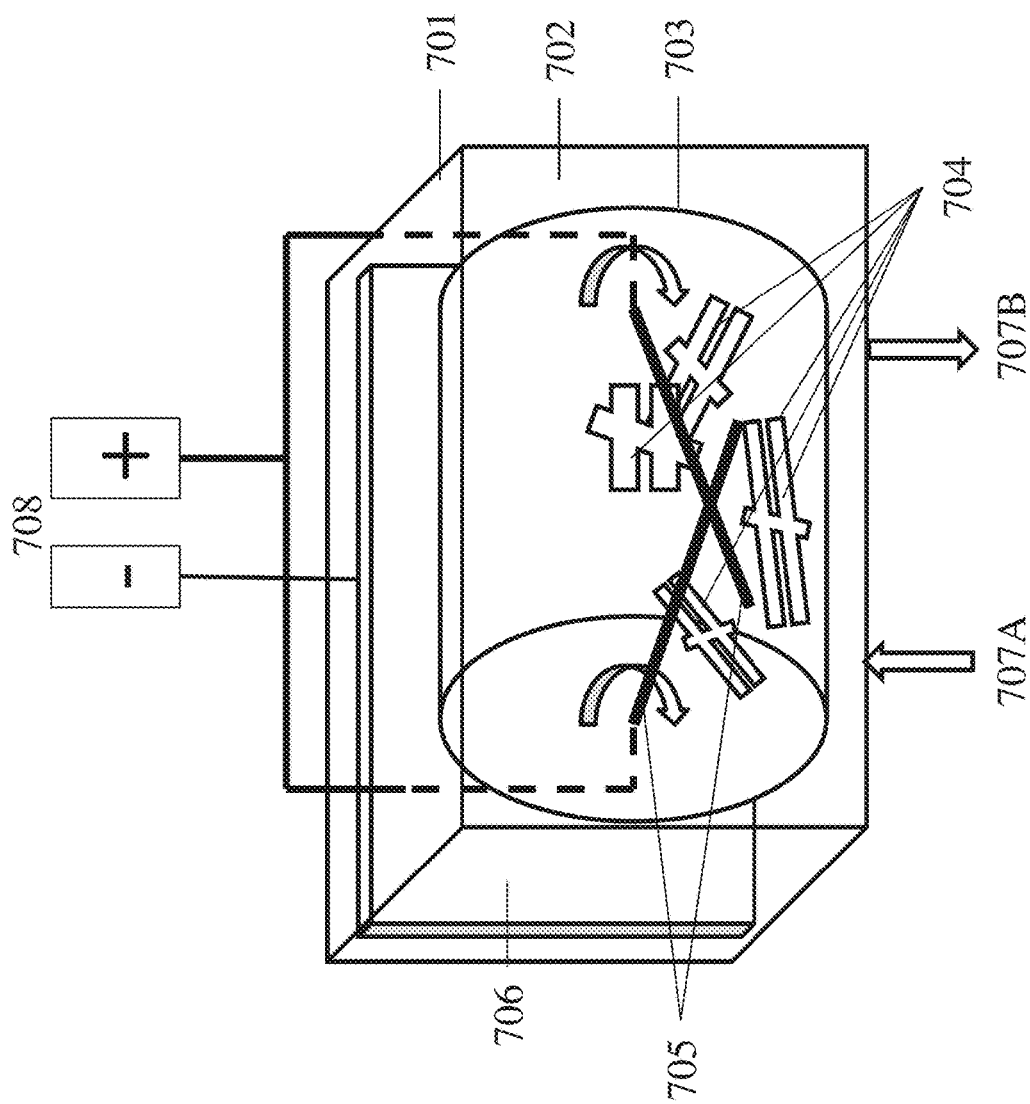
FIGS. 7-9 are schematic illustrations of processing systems comprising a rotatable container, according to some embodiments.

In some embodiments, the electrically conductive pathway comprises an electrically conductive lead, such as a metallic lead. The electrically conductive lead can be inserted into the rotatable container and positioned such that the electrically conductive lead remains in contact with the noble-metal-containing material (and, in some such cases, the noble metal(s) within the noble-metal-containing material) when the container is rotated. During operation, the noble-metal-containing material can be placed in the rotatable container (e.g., a cylindrical container such as a barrel), and the electrically conductive lead(s) (which may be made, for example, of titanium, any other corrosion resistant conductive material, or any other material) can be inserted such that they make contact with the rotatable container and/or the noble-metal-containing material within the rotatable container. In some embodiments, the conductive leads may be positioned such that they continuously remain in electrical contact with the noble-metal-containing material (which may move because of the rotation of the rotatable container), so that substantially all the noble-metal-containing materials remain in electrical contact with the electrically conductive leads. The leads can be connected to the positive pole of a direct current source, and in such a way the noble-metal-containing materials serve as an electrode (e.g., an anode). A non-limiting example of a system in which such arrangements are used is shown in FIG. 7.

In certain embodiments in which an electrical current is used to at least partially remove the noble metal(s), the other electrode (e.g., the cathode) can be made of any corrosion resistant conductive material, such as e.g. stainless steel, and can be placed inside of the leaching reactor (e.g., close to the rotatable container). The noble-metal-containing material can be placed in the rotatable container. The rotatable container can then be closed and immersed into the leaching solution inside the leaching reactor. In some embodiments, as soon as the electric current drops to substantially zero, the leaching solution can be pumped out of the reactor, and, in some such embodiments, rinse water can be pumped into the reactor. The rotatable container can be rotated with or without electrical current being applied, so that the noble-metal-containing materials can be rinsed from the residues of the leaching solution. In some embodiments, the rinse water can then be transported out of the reactor. At this point the cover of the leaching reactor can be lifted and the treated noble-metal-containing material can be removed. Advantageously, human contact with the concentrated acids can be avoided, according to certain embodiments, making the leaching process safe to use.

An exemplary process for the recovery of silver from silver-containing material is now described. The exemplary process comprises three main parts: leaching, dilution, and cementation. During the leaching stage, the silver-containing items are treated with the leaching solution, so that the silver containing surfaces are in the direct contact with the solution, and in such manner, silver metal can be selectively dissolved in the leaching solution and separated from the remaining items, which are made of base metals. Examples of the materials which have been already successfully treated according to this process, include silver plated copper wires (e.g., up to 5wt % of silver, with the balance copper), silver filled copper-zinc perforated tapes (e.g., up to 25 wt % of silver, with the balance being copper-zinc alloy), silver-cadmium oxide filled copper plates (e.g., up to 90 wt % silver, up to 25% cadmium oxide filling on pure copper plates), silver and tungsten containing pellets (40-45 wt % of silver, with the balance being tungsten and some base metals). In the last case the pellets were reduced to powder before being exposed to the action of the leaching solution.

According to certain embodiments, the relative amounts of silver and leaching solution can be up to 60 g of silver per 1 liter of solution, for example, when the solution is at about 55° C. According to some embodiments, if larger amounts of silver are dissolved, the white precipitate of silver sulfate can appear. To dissolve the precipitate, more leaching solution can be added, heated and stirred. In some embodiments, the temperature of the solution is from about 55° C. to about 100° C. (such as from about 55° C. to about 80° C.).

In some embodiments, after a portion of the silver from the silver-containing material has been dissolved and subsequently precipitated within the leaching solution (e.g., as silver sulfate), additional supplemental acid (e.g., additional sulfuric acid) can be added to the leaching solution. The addition of supplemental sulfuric acid can be used to replenish the acid which has been consumed by the formation of silver salt. Thus, in some such embodiments, as the dissolved silver precipitates, new portions of the undissolved metal in the silver-containing material can be dissolved as sulfuric acid is added. In some such embodiments, the leaching process can be performed over much longer continuous periods of time than would be possible were additional supplemental acid not added to the leaching solution. In some embodiments, the solid silver salt (e.g., silver sulfate) can be separated from the leaching solution, for example, via filtration. In some embodiments in which silver sulfate is formed (e.g., when sulfuric acid is used as a supplemental acid), the silver sulfate can be reacted to form silver oxide. The formation of silver oxide from silver sulfate can be achieved, for example, by adding a base (e.g. sodium hydroxide) to the silver sulfate-containing liquid. In some embodiments, the silver oxide can be transformed to silver metal. The formation of silver metal from silver oxide can be achieved, for example, via smelting.

In some embodiments, the formation of a silver-containing solid (e.g., silver precipitate such as silver sulfate) in the leaching solution can be beneficial in separating the silver from other metals. For example, in some embodiments, a coating on the silver-containing material can contain a base metal (e.g., in addition to silver). In some such embodiments, the base metal in the coating can be soluble in the leaching solution and the silver may be at least partially insoluble in the leaching solution (and, thus, form a precipitate in the leaching solution). In some such embodiments, the base metal (e.g., cadmium) may remain dissolved in the leaching solution while the silver precipitates. In some such embodiments, the silver-containing precipitate may be at least partially separated from the base metal (e.g., cadmium), for example, via filtration or any other suitable solid liquid separation process. In some such embodiments, the silver can be recovered in substantially pure form.

In some embodiments (e.g., in certain embodiments in which electrical current is transported through the silver-containing material during the removal of silver), silver salt (e.g., silver sulfate) may be initially included in the leaching solution (e.g., in an amount up to the saturation limit of the silver salt). In some embodiments, the voltage that is applied across the silver-containing material and a second electrode is kept relatively low, such as at or lower than about 5V, at or lower than about 2V. In some such embodiments, silver will be deposited on the second electrode (which can be the cathode of the electrochemical cell). In some such embodiments, the silver dissolved from the silver-containing material replenishes the silver deposited on the second electrode. In some embodiments, at the end of the stripping process, some amount of silver remains dissolved in the leaching solution. In some embodiments, silver which has been deplated during the process can be recovered from the second electrode.

In certain embodiments (including certain embodiments in which relatively large amounts of gold are dissolved), a gold precipitate (e.g., a dark-brown gold precipitate) can appear in the leaching solution. In some embodiments, the precipitate can be accumulated and separated from the leaching solution using filtration or any other suitable liquid-solid separation technique. According to certain embodiments, if no other metals are dissolved in the leaching solution along with gold, the stripping process can be operated over a relatively long continuous period. In some such cases, replenishing the leaching solution is not needed unless some of the original leaching solution escapes from the leaching solution container. In some embodiments in which other metals (e.g., base metals and/or silver, palladium, and/or platinum) are dissolved together with gold in the leaching solution, the dilution of the leaching solution and separation of solid gold can be performed before the concentration of the other metal(s) dissolved in the leaching solution (e.g., the base metal and/or silver, palladium, and/or platinum) exceeds its saturation level within the leaching solution. In some such embodiments, mixing of solid gold with an insoluble salt of a non-gold metal can be avoided, which can enhance the degree to which the gold is purified.

In some embodiments, re-circulation of the solution speeds up the process. To prevent shadowing, the noble-metal-containing items can be strategically arranged, according to certain embodiments. For example, in some embodiments, the noble-metal-containing items can be placed in one layer (without overlapping) on multiple racks. In some such embodiments, the leaching solution can be circulated around the noble-metal-containing items. Such an arrangement is illustrated, for example, in FIG. 1. In FIG. 1, noble-metal-containing items 101 are located within container 103, which can contain leaching solution. In some embodiments, trays 102 are used to support noble-metal-containing items 101. In some embodiments, leaching solution can be circulated through container 103, for example, by transporting leaching solution into inlet 104 and through outlet 105.

Figure 2:
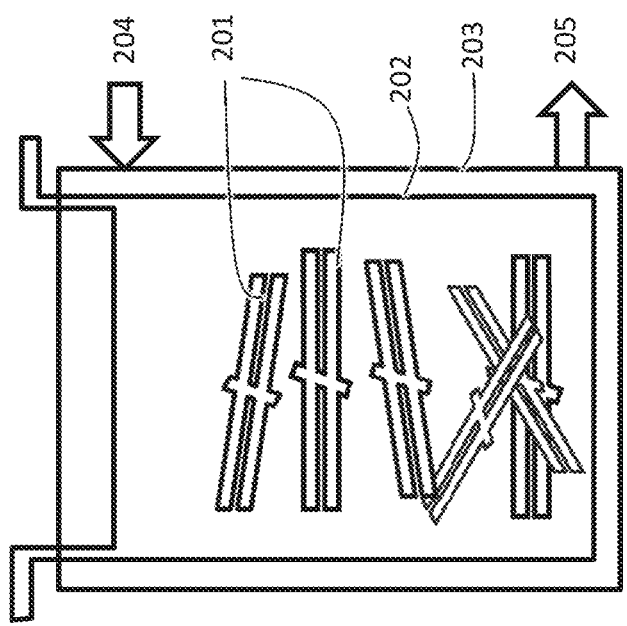
FIG. 2 is a cross-sectional schematic illustration of a system in which noble-metal-containing materials are located within a basket or other container immersed in a vessel containing a leaching solution (which can be recirculated), according to certain embodiments.

In some embodiments, the noble-metal-containing items can be placed in a container and can be loaded into another container in the middle of the leaching process, such that the items change positions and the shadowed zones become exposed. Such an arrangement is illustrated, for example, in FIG. 2. In FIG. 2, noble-metal-containing items 201 are located within first container 202, which is located within second container 203. In some embodiments, the first container can have openings through which leaching solution can be transported (into first container 202 from second container 203 and out of first container 202 to second container 203). In some embodiments, leaching solution can be circulated through container 202 and/or container 203, for example, by transporting leaching solution into inlet 204 and through outlet 205.

Figure 3:
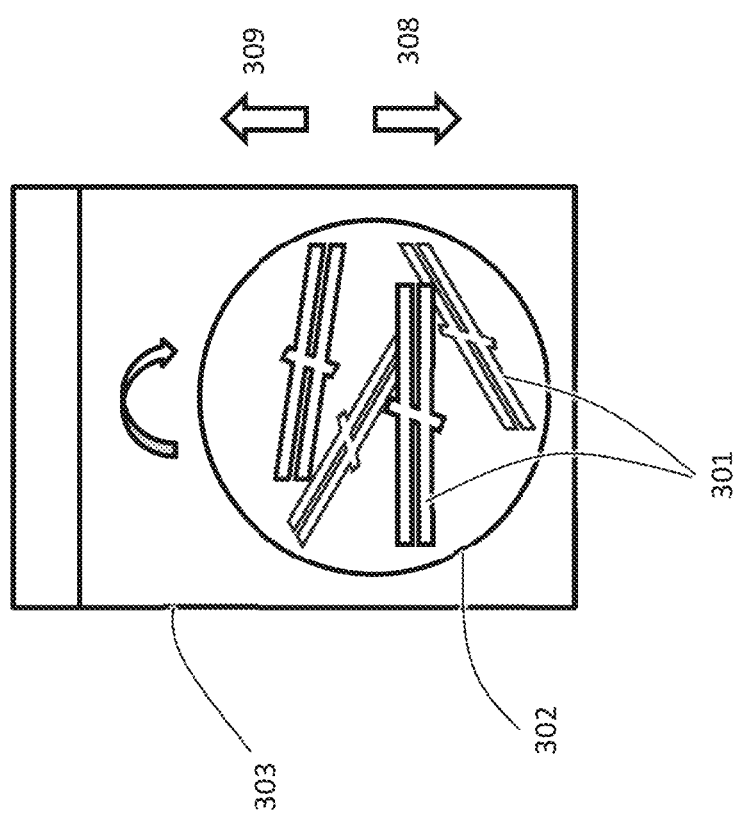
FIG. 3 is a schematic cross-sectional illustration of a system in which noble-metal-containing materials are located within a rotatable container within a vessel containing leaching solution, according to some embodiments.

In some embodiments, the noble-metal-containing items can be placed into a rotatable container (e.g., a large slow rotating barrel). In some such embodiments, there is little or no need to circulate the leaching solution. The rotating container can correspond to, for example, any of a number of commercially available plating barrels. An example of such a process is shown in FIG. 3. In FIG. 3, noble-metal-containing items 301 are located within rotatable container 302. Rotatable container 302 can be located within second container 303. In some embodiments, rotatable container 302 can have openings through which leaching solution can be transported (into rotatable container 302 from second container 303 and out of rotatable container 302 to second container 303). In some embodiments, leaching solution can be circulated through container 302 and/or container 303, for example, by transporting leaching solution into an inlet and/or through an outlet of second container 303. In some embodiments, rotatable container 302 can be lowered into second container 303 (e.g., by moving rotatable container 302 in the direction of arrow 308). In some embodiments, rotatable container 302 can be raised out of second container 303 (e.g., after dissolving noble metal(s) from noble-metal-containing material 301), for example, by moving rotatable container 302 in the direction of arrow 309.

The selection of the type of container in which to place the noble-metal-containing material may depend upon the appearance and/or other qualities of the types of noble-metal-containing materials that are being processed.

FIG. 7 is an exemplary schematic illustration of a leaching system in which a rotatable container (e.g., a barrel) is used to house the noble-metal-containing material. In FIG. 7, rotatable container 703 is placed inside leaching container 701, which can be at least partially filled with leaching solution 702. The rotatable container can be at least partially (e.g., completely) submerged within the leaching solution in container 701. Noble-metal-containing material 704 can be loaded into rotatable container 703. In some embodiments, the rotatable container is made of electrically insulating material. In certain embodiments, anode leads (e.g., titanium rods) can be positioned within rotatable container 703 such that they remain in contact with noble-metal-containing material 704. In certain embodiments, the electrically conductive leads are inserted into the rotatable container (e.g., from one or multiple sides of the rotatable container) and remain loose inside the barrel so that the noble-metal-containing material remains in contact with the leads. The leads can be connected to the anode, such that the contact of the leads with the noble-metal-containing items (which can be in contact with each other) make the noble-metal-containing material work as an anode. Cathode 706 can be positioned within container 701 (e.g., outside rotatable container 703). Cathode 706 can be positioned, in some embodiments, such that the shortest distance between cathode 706 and rotatable container 703 is less than 1 meter, less than 10 cm, or less than 1 cm. In some embodiments, electrical current source 708 (e.g., a DC source or an AC source) can be configured such that it makes electrical contact with cathode 706 and the noble-metal-containing material 704 (e.g., via anode leads 705). In some such embodiments, an electrical current can be applied across the anode and the cathode, to aid in the dissolution of noble metal(s) from the noble-metal-containing material. In some embodiments, leaching container 701 comprises an inlet 707A and/or outlet 707B. Inlet 707A and outlet 707B can allow one to circulate leaching solution and/or rinse liquid into and out of the leaching reactor.

FIG. 8 is another exemplary schematic illustration of a leaching system in which a rotatable container is used to house the noble-metal-containing material, according to certain embodiments. In FIG. 8, rotatable container 803 is placed inside leaching container 801, which can be at least partially filled with leaching solution 802. The rotatable container can be at least partially (e.g., completely) submerged within the leaching solution in container 801. Noble-metal-containing material 804 can be loaded into rotatable container 803. Cathode 805 can be positioned within container 801 (e.g., outside rotatable container 803). Cathode 805 can be positioned, in some embodiments, such that the shortest distance between cathode 805 and rotatable container 803 is less than 1 meter, less than 10 cm, or less than 1 cm. In some embodiments, electrical current source 808 (e.g., a DC source or an AC source) can be configured such that it makes electrical contact with cathode 805 and the noble-metal-containing material 804. In some such embodiments, rotatable container 803 can comprise an electrically conductive material. For example, rotatable container 803 can be made of an electrically conductive material (e.g., a corrosion resistant conductive material) and/or rotatable container 803 can include an electrically conductive lining/insert (e.g., made of corrosion resistant conductive material). In certain embodiments, rotatable container 803 is connected to the anode of the current source, and the rotatable container can itself serve as part of the anode. Current can be transported to the noble-metal-containing material within the rotatable container via the electrically conductive material from which at least a portion of the rotatable container is made. In some such embodiments, an electrical current can be applied across the anode and the cathode, to aid in the dissolution of noble metal(s) from the noble-metal-containing material. In some embodiments, container 801 comprises an inlet 806A and/or outlet 806B. Inlet 806A and outlet 806B can allow one to circulate leaching solution and/or rinse liquid into and out of the leaching reactor.

FIG. 9 is another exemplary schematic illustration of a leaching system in which a rotatable container is used to house the noble-metal-containing material, according to certain embodiments. In FIG. 9, rotatable container 904 is placed inside container 901, which can be at least partially filled with leaching solution 903. The rotatable container can be at least partially (e.g., completely) submerged within the leaching solution in container 901. Noble-metal-containing material 905 can be loaded into rotatable container 904. In some such embodiments, container 901 can comprise an electrically conductive material. For example, container 901 can be made of an electrically conductive material (e.g., a corrosion resistant conductive material) and/or container 901 can include an electrically conductive lining/insert (e.g., made of corrosion resistant conductive material). In some embodiments, container 901 can be connected to the cathode of the current source, and container 901 can itself serve as part of the cathode. At the same time, container 901 can contain the leaching solution. In some embodiments, cathode plates 902 can be positioned within container 901 (e.g., outside rotatable container 904). For example, cathode plates 902 can be attached to the inner surface of container 901. Cathode plates 902 can increase the cathode surface area.

Cathode plates 902 can be positioned, in some embodiments, such that the shortest distance between cathode plates 902 and rotatable container 904 is less than 1 meter, less than 10 cm, or less than 1 cm. In some such embodiments, rotatable container 904 can comprise an electrically conductive material. For example, rotatable container 904 can be made of an electrically conductive material (e.g., a corrosion resistant conductive material) and/or rotatable container 904 can include an electrically conductive lining/insert (e.g., made of corrosion resistant conductive material). In certain embodiments, rotatable container 904 is connected to the anode of the current source, and the rotatable container can itself serve as part of the anode. Current can be transported to the noble-metal-containing material within the rotatable container via the electrically conductive material from which at least a portion of the rotatable container is made. In some embodiments, an electrical current source (e.g., a DC source or an AC source) can be configured such that it makes electrical contact with cathode plates 902 and the noble-metal-containing material 905. In some such embodiments, an electrical current can be applied across the anode and the cathode, to aid in the dissolution of noble metal(s) from the noble-metal-containing material. In some embodiments, leaching container 901 comprises an inlet 906A and/or outlet 906B. Inlet 906A and outlet 906B can allow one to circulate leaching solution and/or rinse liquid into and out of the leaching reactor.

In some embodiments, the rotatable container can include openings (e.g., perforations) in its wall. By including such openings, leaching fluid may be transported into and out of (and, in some cases, can be circulated within) the rotatable container during the leaching process.

The leaching solution is considered saturated (loaded with noble metal(s)), according to certain embodiments, when the concentration of noble metal(s) rises to a threshold value and remains constant. In some embodiments, selective silver electrodes can be used to monitor the concentration of silver in the solution. Additionally, the conductivity of the solution and/or the specific gravity of the solution can also be used as control parameters, as these parameters will change very little (or not at all) once the solution has become saturated with noble metal(s) such as silver (perhaps changing slightly because of some minor leaching of the base metals). The end of the leaching process can be also determined by observation at the moment, for example, when the noble metal coating is visibly removed. In some embodiments, when silver is accumulated in the form of silver salt, the solution is considered to be saturated when the concentration of the dissolved base metals ions rises to a threshold value and remains substantially constant. In some embodiments, selective cadmium electrodes can be used to monitor the concentration of cadmium in the solution. After finishing the leaching process, the rotatable container can be immersed in rinse water. The rinsed, depleted items can then be removed from the process.

The leaching solution can contain any of the components described in detail above. For example, in one set of embodiments, the leaching solution includes 90 wt % of 98 wt % sulfuric acid and 10 wt % of 68 wt % nitric acid. The relatively low amount of water within the leaching solution can ensure that copper, zinc, and/or other substrate metals will not dissolve during the dissolution of the silver plating. The dissolved silver can form silver nitrate, as follows:

$$Ag + 2\ HNO_3 \rightarrow AgNO_3 + NO_2 + H_2O \qquad [1]$$

The silver nitrate can be chemically reacted to form silver sulfate and accumulated in the solution. Generally, addition of water to this solution should be avoided, as it is often accompanied by vigorous formation of $NO_x$ compounds. Additions of nitrate ions (e.g., nitric acid and/or a source of nitrate ions that is not nitric acid) can be made if some evaporation of the solution has occurred.

Nitrogen dioxide dissolves in water, consuming oxygen from the air, so no gas formation is observed:

$$4\ NO_2 + 2\ H_2O + O_2 \rightarrow 4\ HNO_3 \qquad [2]$$

Silver nitrate can interact with the sulfuric acid, and can be accumulated in the leaching solution as silver sulfate. The nitrate ions (e.g., nitric acid and/or a source of nitrate ions that is not nitric acid) can be liberated to dissolve new portions of silver:

$$AgNO_3 + H_2SO_4 = Ag_2SO_4 + HNO_3 \qquad [3]$$

If an alkanesulfonic acid is present, silver nitrate can be transformed to the silver salt of the corresponding alkanesulfonic acid. For example, if methanesulfonic acid is present in the acid mixture, silver nitrate can be accumulated in the form of silver methanesulfonate according to:

$$AgNO_3 + CH_3S(=O)_2-OH = CH_3S(=O)_2-OAg + HNO_3 \qquad [3a]$$

As the leaching solution is highly acidic, it can be advantageous, according to certain embodiments, to conduct the process in a closed leaching reactor.

Figure 4:
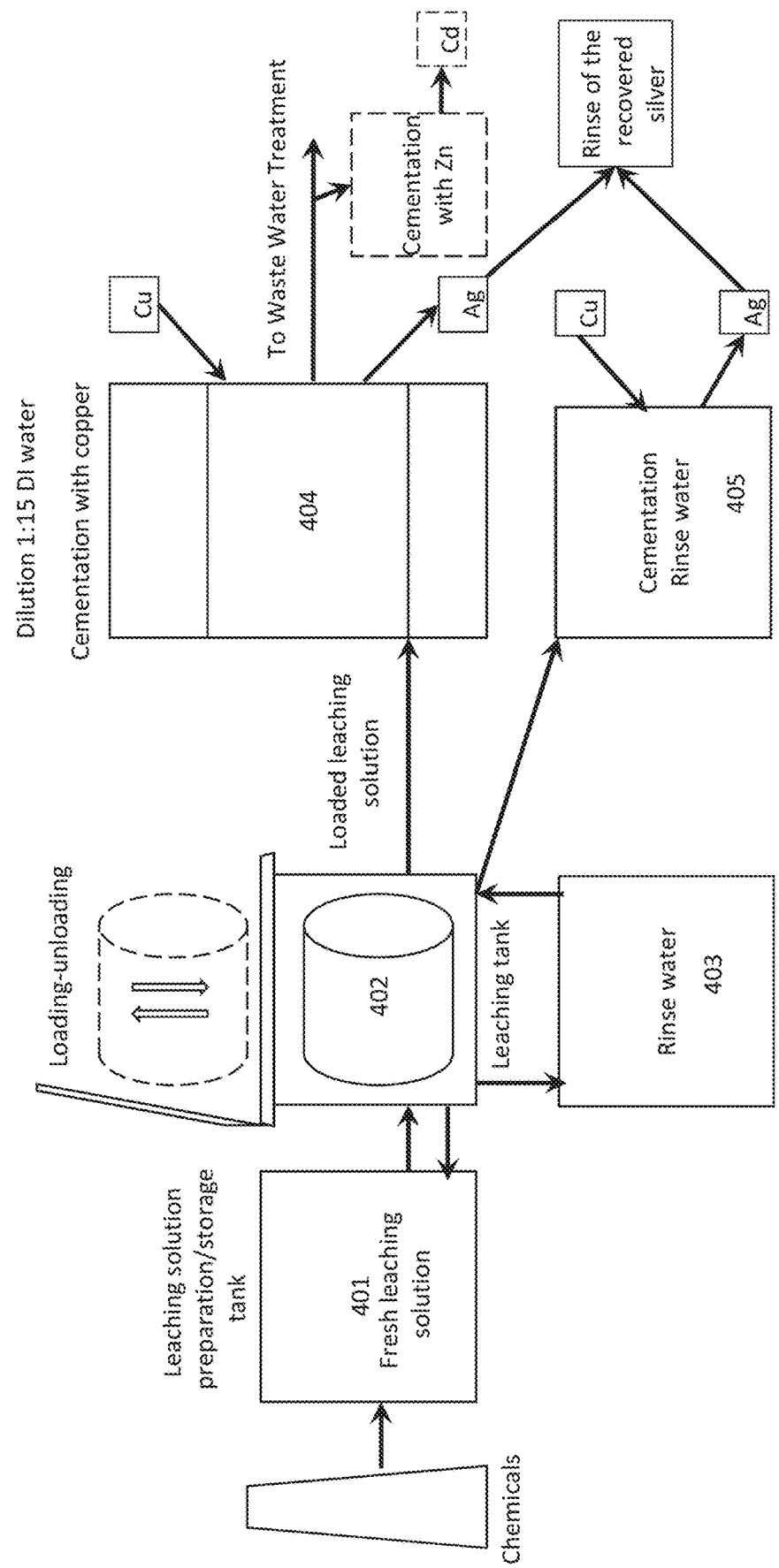
FIG. 4 is, according to one set of embodiments, a schematic illustration of a system in which silver metal is recovered from silver-containing material.

FIG. 4 is a schematic illustration outlining an exemplary sequence of operations. In FIG. 4, the leaching solution is prepared by mixing the components in separate leaching solution preparation container 401, in which the solution is heated up to temperature. The noble-metal-containing material can then be positioned within a rotating drum, which is inserted into a leaching tank 402. The cover of the leaching tank can be closed and the leaching solution can be pumped from tank 401 into the tank 402. According to certain embodiments, the barrel can then be rotated and the leaching process can start. The samples of the leaching solution can be taken for monitoring the noble metal(s) concentration, the conductivity, and/or the specific gravity of the solution. When the leaching process is over, the loaded leaching solution can be drained/pumped into the next tank 404 for further treatment. The noble-metal-containing material can be optionally brought in contact with the fresh portion of the leaching solution and exposed to a short period of leaching (e.g., 2-3 min) to remove small amounts of residual noble metal(s). After finishing this process, the slightly loaded leaching solution can be pumped out of the tank and kept for the next leaching cycle. Without opening the tank, the tank can be filled with DI rinse water, and the barrel can make several turns to rinse the treated items. After rinsing, the rinse water can be pumped out of the tank and sent directly to the cementation of the rinse water 405. After rinsing, the tank can be filled with the new portion of DI rinse water, which can be stored in the rinse water tank 403. The cover of the leaching tank can then be opened, and the rinsed treated items can be unloaded. Subsequently, a new portion of noble-metal-containing material can be loaded in the drum, inserted in the tank, and covered. The slightly loaded leaching solution can then be brought in contact with the noble-metal-containing material. When the leaching is over, the material can be rinsed with the rinse water from the tank 403, which can then be sent to the cementation process. The tank can then be rinsed with fresh DI water for the second time, which can then be stored in the rinse water tank, etc.

In general, the leaching time depends on the thickness of the plating, and can take between 5 min and 60 min, according to certain embodiments. The second leaching step can, in some embodiments, be 2-3 min. In some embodiments, each rinse process takes 2-3 min.

The loaded leaching solution can be diluted with DI water as the next step of the process. In certain embodiments, the proportion of DI water to leaching solution can be from about 5:1 to about 20:1. In some embodiments, the proportion of DI water to leaching solution can be from about 10:1 to about 20:1. The dilution can be accomplished very carefully by adding small portions of the loaded leaching solution to the full amount of water. In some embodiments, the combined fluids are immediately and vigorously stirred. By proceeding in such a manner, formation of $NO_x$ compounds can be avoided. According to certain embodiments, the resulting solution is warm (e.g., about 40° C.) with an acidic pH (e.g., pH=−0.05). In some embodiments, cold water and/or ice may be used to reduce the temperature of the fluids.

After dilution, the leaching solution can be forwarded to a cementation reactor. In certain embodiments, urea can be added to the diluted leaching solution. The urea may be added, according to some embodiments, to neutralize the unused nitrate ions, which may remain after the leaching process. In certain embodiments, the urea is added to the diluted leaching solution until fuzzing substantially stops. In the cementation reactor, the leaching solution can be left in contact with scrap pieces of pure copper.

Cementation with copper can be an advantageous way to recover metallic silver, according to certain embodiments, because it is simple to implement and provides a good selectivity for silver. Also, scrap copper is generally easily available. The overall reaction is:

$$2\ Ag^+ + Cu^0 \rightarrow 2\ Ag^0 + Cu^{2+} \qquad [4]$$

Stirring the solution can accelerate the process. Generally, silver sponge will appear in the solution, and some copper will be dissolved. In some embodiments, the pieces of copper are generally large enough to assure easy separation of the sponge silver. According to Equation 4, each part of the recovered silver requires about 0.3 parts of copper (by weight). Although in some such embodiments some dissolution of copper occurs because of the presence of the nitrate ions, it has been established experimentally that the consumption of copper is usually about ⅓ of the weight of the recovered silver. The cementation is generally complete when the concentration of silver in the solution drops to substantially zero (which can be determined, for example, using a chloride ion test). The silver sponge can be filtered out of the solution, rinsed with DI water to remove the contamination of copper ions, and can be melted into bars. Cementation with copper will generally produce relatively pure silver of 98-99 wt %.

Figure 11:
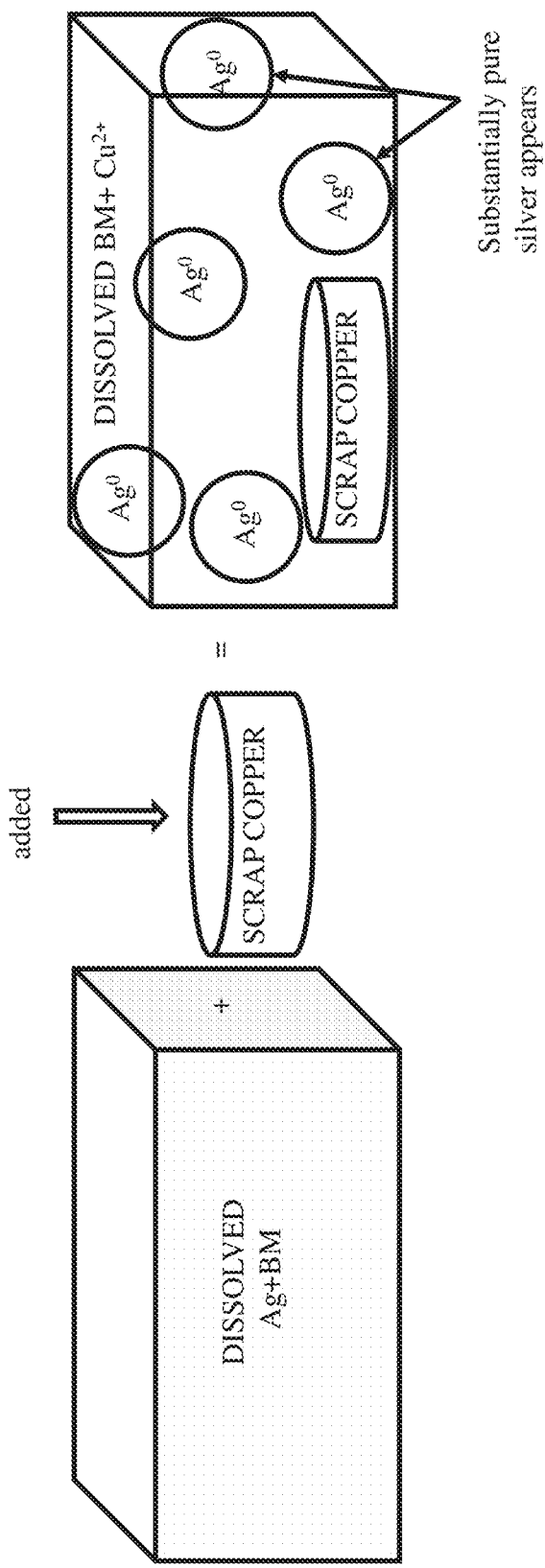
FIG. 11 is a schematic illustration of an exemplary cementation process in which scrap copper is used to produce silver metal from a silver-containing solution.

FIG. 11 is a schematic illustration of an exemplary cementation process in which scrap copper is used to produce silver metal from a silver-containing solution.

The same cementation process can also be used to recover dissolved silver from the spent rinse water. The amount of copper in the spent rinse water is generally less than the amount of copper in the liquid from the main process, as the rinse water is less acidic.

Alternatively, the rinse water can be pumped through a packed column containing ionic exchange resins, in order to capture the residual silver ions.

After the cementation, the solution will generally contain dissolved copper and some minor base metals if they were initially present in the noble-metal-containing material. The spent solution can be forwarded to the waste water treatment. If it is preferred to recover copper in the metallic form, it may be cemented out using any other scrap metal such as iron, zinc, aluminum, and the like.

In certain embodiments, silver can be recovered from material comprising silver and cadmium oxide (CdO). If the material contains a Ag—CdO coating, which was relatively thick in the treated samples, it may be advantageous to increase the reaction speed by using anodic stripping, according to certain embodiments. The silver-containing material can be used as an anode, and stainless steel rods (or other conductive materials) can be used as a cathode, in some embodiments. The electrodes can be connected to a power supply, and an electric current can be applied. The current will drop to at or near zero when the dissolution of the coating is over. It is favorable, in some cases, to use moderate amperage to avoid overheating of the solution, which may lead to the formation of $NO_x$ compounds. The set-up configurations shown in FIGS. 1-3 can be all used in this process. In such cases, the rack, the container/reactor, and/or the rotatable container can be connected to the power supply and used as an anode. The rotatable container (e.g., in the form of a plating barrel, which is normally used for plating operation) can be used as the electrode in this process, as the anodic bar inside the barrel can be configured to remain in electrical contact with the treated material.

In some such embodiments, the loaded leaching solution will contain silver as well as the dissolved cadmium. Cementation with copper can selectively remove silver from the solution. In some cases in which it is desirable to recover cadmium before the spent solution is sent to the waste water treatment, a second cementation operation can be performed in which the cadmium and/or copper are cemented and recovered in their metallic form. Cadmium and/or copper can be cemented on e.g. scrap zinc, iron and/or aluminum. As an example, cementation of cadmium with Zn can occur as follows:

$$Cd^{2+}+Zn^0 \rightarrow Cd^0+Zn^{2+} \qquad [5a]$$

As another example, cementation of copper with Zn can occur as follows:

$$Cu^{2+}+Zn^0 \rightarrow Cu^0+Zn^{2+} \qquad [5b]$$

In some instances in which copper and cadmium are both present, the copper can be displaced from the solution before cadmium. Thus, this process can be used for separate recovery of copper and cadmium. In some such embodiments, the concentration of copper in solution is monitored (e.g., continuously monitored). In some such embodiments, once the concentration of copper drops to substantially zero, the copper metal can be separated from the solution by any suitable solid-liquid separation technique. In some such embodiments, the solution continues to remain in contact with the zinc, and cadmium can then be cemented out (and, according to certain embodiments, recovered).

The cementation of copper and/or cadmium can be accomplished, for example, in an agitated vessel, with a removable zinc liner, on pieces of scrap zinc, or via any other suitable method.

An exemplary process for the recovery of gold and silver from gold and silver-containing material is now described. In this exemplary process, gold and silver are recovered separately. There are two main differences between this process and the process described above for silver recovery. First, anodic stripping is employed. Second, after dilution, the solution is filtered to remove fine particles of the solid gold metal. Accordingly, the exemplary process described below include the following four main steps: anodic dissolution—dilution—filtration of gold powder—cementation of silver.

Figure 5:
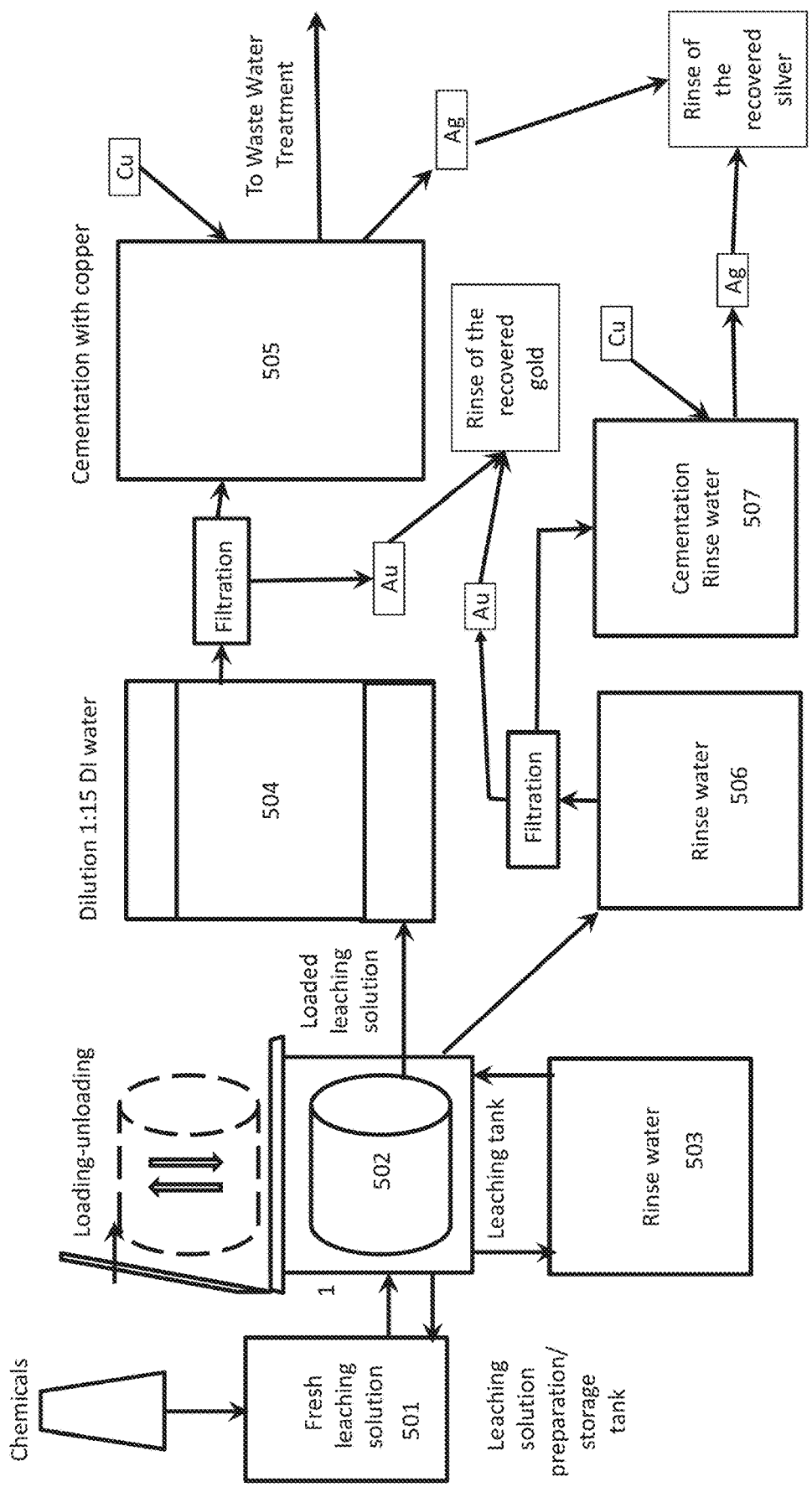
FIG. 5 is a schematic illustration of a process in which silver and gold are recovered from material containing silver and gold, according to certain embodiments.

Items which have been treated in experiments using this method include karat gold filled scrap, gold and silver filled scrap, and gold plated copper wires. FIG. 5 is a schematic illustration of an exemplary process used to treat gold and silver containing material. The process is similar to that described above for the silver-cadmium containing material, with some additions. The gold and silver-containing material can be put on racks, in baskets, or in a rotatable container (e.g., a barrel) 502, which can be used as an anode. Stainless steel bars (or other conductive materials) can be used as a cathode. Electrical current can be applied across the anode and the cathode to aid in the dissolution of the gold and silver. Generally, the electrical current drops to at or near zero once the process of dissolving the silver and gold is complete. Gold, silver, and minor amounts of base metals can be dissolved in the solution. The moment when the solution can be considered saturated can be determined by measuring the conductivity and/or the specific gravity of the solution. The saturation can also be detected by observing the removal of gold and silver from the stripped material.

The leaching solution used in the silver process described above is also capable of oxidizing and dissolving gold. In certain cases in which gold is dissolved, the speed with which the process is performed can be increased if electrical force (anodic stripping) is used. Thus, the strong acid liquids described elsewhere herein can be used to dissolve silver, gold, and/or combinations of silver and gold from materials.

Not wishing to be bound by any particular theory, dissolution of the gold and silver may take place as follows. When the stripping solution contains nitric acid and sulfuric acid, nitric acid can act as a base on the sulfuric acid, forming nitronium cations $NO_2^+$ $$HNO_3+2H_2SO_4 \rightarrow NO_2^++H_3O^++2HSO_4^- \qquad [6]$$

In mixtures that comprise alkanesulfonic acids, the following reaction may occur:

$$HNO_3 + 2RS(=O)_2OH \rightarrow NO_2^+ + H_3O^+ + 2RS(=O)_2O^- \quad [6a]$$

The formation of a nitronium ion $NO_2^+$ can occur through the addition of a proton to $HNO_3$, as follows:

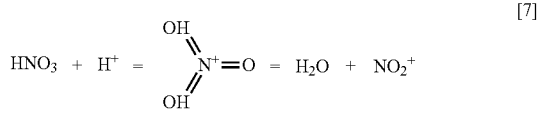   [7]

The nitronium cations can oxidize gold:

$$Au^0 + 3NO_2^+ \rightarrow Au^{3+} + 3NO_2 \quad [8]$$

Nitric acid exists in the solution in equilibrium, according to:

$$2HNO_3 \leftrightarrow NO_2^+ + NO_3^- + H_2O \quad [9]$$

When water is added in excess, Equation 9 is shifted toward the nitric acid side, $NO_2^+$ ion is no longer present in the solution, and gold precipitates in metallic form.

Figure 10:
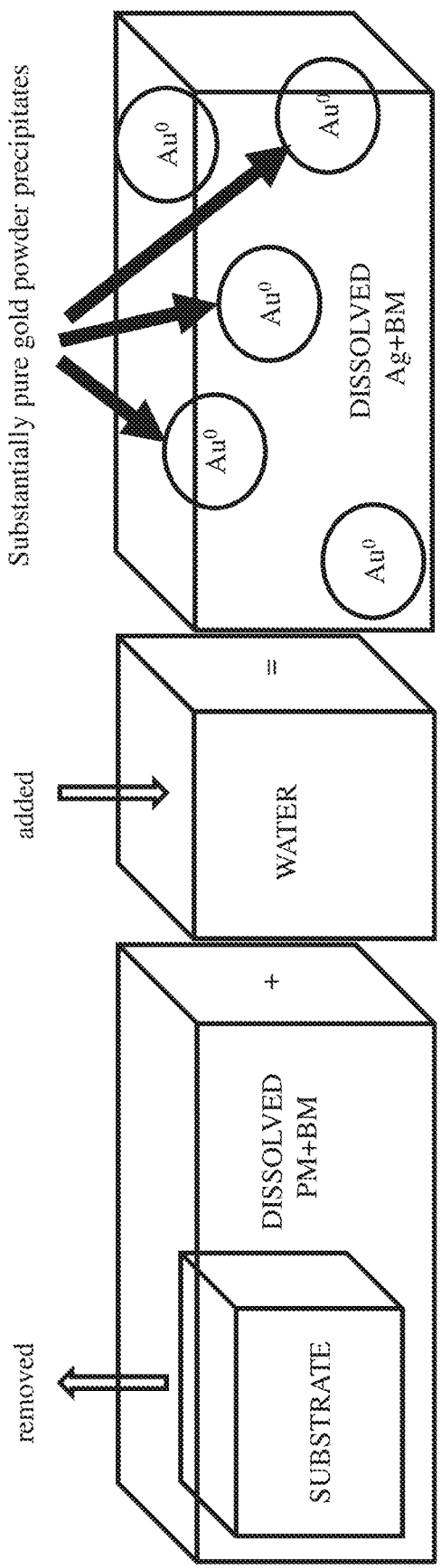
FIG. 10 is a schematic illustration showing an exemplary process by which gold is precipitated from a gold-containing solution using water.

Accordingly, in certain embodiments, the second step of the process is the dilution of the solution in Equation 4, which can be accomplished as described above for the silver process. During the dilution, very fine gold dust can be formed in the solution. The gold dust can have the appearance of fine black/deep purple particles. In general, substantially all of the dissolved gold can be precipitated out of solution, such that the diluted solution does not contain any substantial amounts of additional dissolved gold. FIG. 10 is a schematic illustration showing an exemplary process by which gold is precipitated from a gold-containing solution using water. The gold powder can be filtered out of the solution and recovered. The filtered gold can be washed with DI water and melted into a bar.

The remaining leaching solution contains silver and, in some cases, minor amounts of some base metals. For selective recovery of silver, cementation with copper 505 can be used (which can be the same process as described above for the silver recovery process). The resulting silver sponge can be rinsed and melted. The spent leaching solution can be discarded and/or treated as waste water.

The spent rinse water in container 506 can contain fine gold powder, which can be filtered out to recover gold. The remaining rinse water contains some dissolved silver, which can be recovered by cementation with pure copper in vessel 507, as described above for the silver recovery process.

It should be understood that, in each instance in which nitrate ions are described herein, the nitrate ions could originate from nitric acid (in part, or entirely) or from a source that is not nitric acid (in part, or entirely), such as a nitrate salt. In addition, in each instance in which nitric acid is described herein, the nitric acid could be replaced, in whole or in part, with a source of nitrate ions that is not nitric acid (e.g., a nitrate salt).

U.S. Provisional Patent Application Ser. No. 62/184,172, filed Jun. 24, 2015 and entitled "Selective Removal of Noble Metals Using Acidic Fluids, Including Nitric Acid Containing Fluids" and U.S. Provisional Patent Application Ser. No. 62/210,101, filed Aug. 26, 2015 and entitled "Selective Removal of Noble Metals Using Acidic Fluids, Including Fluids Containing Nitrate Ions" are each incorporated herein by reference in their entirety for all purposes.

The following examples are intended to illustrate certain embodiments of the present invention, but do not exemplify the full scope of the invention.

EXAMPLE 1

This example describes the removal of silver from scrap material containing thick silver plating on a tape made of a copper-zinc alloy. Both sides of the tape were analyzed with a SPECTROSCOUT XRF (x-ray fluorescence) Analyzer (AMETEK). The silver-plated side of the tape was found to be covered by almost pure silver, having the following composition:
Ag=99.5±0.5 wt %,
Zn=0.41±0.05 wt %,
Cu=0.043±0.032 wt %.
The non-plated side was identified as a copper-zinc alloy with the following composition:
Cu=62.2±0.4 wt %,
Zn=37.8±0.4 wt %.
A plate having a length of 5 inches was cut off. One side of it (2.2 inches long) was immersed into a leaching solution. The leaching solution was composed of 85 ml of concentrated sulfuric acid (certified 95.0 to 98.0 wt %, by Fisher Sci.) and 15 ml of concentrated nitric acid (certified 68.0 to 70.0 wt %, by Fisher Sci.). Considering the highest possible concentration of the concentrated nitric acid (70.0 wt %) and its density (1.41 g/mL), as well as the highest concentration of sulfuric acid (98.0 wt %) and its density (1.84 g/mL), the concentration of pure nitric acid in this solution was equal to 8.34 wt %, the concentration of pure sulfuric acid was 86.33 wt %, and the concentration of water was 5.34 wt %.

The solution was heated to 60° C. and stirred with a magnetic stirrer. The silver plated sample was left in the stripping solution for 20 minutes, and the color of the sample on the treated part changed to yellow, which was the color of the non-plated, copper-zinc alloy side of the tape. The stripping solution did not change in color, but became a little bit more opaque. There was no blue color, which would signal dissolution of copper in the leaching solution (which would be undesirable). The experiment was continued for an additional 5 minutes, and the sample was removed from the solution. The sample was then immersed in deionized (DI) water, rinsed, and dried. The stripped side was analyzed by XRF and showed the following percentage of metals:
Cu=61.6±0.3 wt %,
Zn=38.3±0.3 wt %.
Silver was not detected. There were no visual signs of corrosion of copper-zinc alloy. A volume of DI water that was 10 times larger than the leaching solution was prepared in a beaker and stirred by a magnetic stirrer at 300 rpm. The leaching solution containing the dissolved silver was carefully added to the DI water in small portions, and the resulting solution was vigorously stirred after addition of each small portion. No formation of brown $NO_x$ was observed. As soon as the dilution was over, urea was added to the diluted solution until the fizzing was no longer observed. Scrap copper metal was immersed into the solution, and cementation of silver started substantially immediately. After two hours, a chloride ion test showed only light opacity, meaning that almost all silver ions were displaced from the solution. The solution was left overnight so that the cementation process could be completed. Subsequently, powdered silver metal was filtered out of the solution, dried, mixed with borax, and melted into a nugget in an ashing furnace AF1 (Vecstar) at 1050° C. The weight of the nugget was 1.283 g. For comparison, a plate of the same length as the length of the stripped sample was cut from the original sample material and weighed (having a weight of 4.801 g). Assuming the sample had the same density of plating, the weight fraction of the recovered silver would be 26.7 wt %, which represents a very heavy plating. Subsequently, the stripped part of the plate was cut off and completely dissolved in 50 vol % nitric acid solution in order to detect any unstripped silver values; the resulting solution was analyzed by ICP-OES (SPECTRO ARCOS EOP, AMETEK) (inductively coupled plasma mass spectrometry). The amount of silver measured in the solution was 0.748 mg, which represents only 0.06 wt % of the recovered silver nugget's weight, meaning that substantially all of the silver was deplated and recovered in the process.

To calculate the silver content in this type of material, another sample weighing 2.382 g was prepared and completely dissolved in the leaching solution, containing 50% by volume of concentrated nitric acid and 50% DI water. The sample of the solution was analyzed by ICP and resulted in 0.594 g of dissolved silver in 41 ml of the solution, or in 24.94 wt % of silver content in the sample, which is close to the stripped value of 26.7%. This demonstrated that the amount of silver stripped from the sample using the method described in this example corresponds to substantially the entire amount of silver in the original sample.

For comparison, the experiment was repeated with the same sample size of the same material; the only difference was that the leaching solution was composed of 225 ml of concentrated sulfuric acid and 75 ml of concentrated nitric acid. Considering the highest possible concentration of the concentrated nitric acid (70.0 wt %) and its density (1.42 g/mL), as well as the highest concentration of sulfuric acid (98.0 wt %) and its density (1.84 g/mL), the concentration of the pure nitric solution in this solution was equal to 14.24 wt %, the concentration of pure sulfuric acid was equal to 78.06 wt %, and the concentration of water was 7.70 wt %.

As soon as the sample was immersed in the leaching solution, a large amount of brown $NO_x$ was generated, and the color of the solution changed to blue, which is a characteristic of the formation of copper ions. This demonstrated that elevated concentrations of nitric acid in the leaching solution leads to extensive dissolution of the base metal substrate, an undesirable outcome for the selective recovery of precious metals.

EXAMPLE 2

This example demonstrates the removal of gold from gold filled wire. Two pieces of gold filled wire were prepared, weighed, and their surface was analyzed by XRF. The mass of the first wire was 2.163 g, and the following metals were detected on its surface:
Au=95.6±0.6 wt %,
Fe=1.74±0.11 wt %,
Cu=1.26±0.06 wt %,
Co=0.81±0.07 wt %,
Ni=0.56±0.08 wt %.
The second piece weighed 3.279 g and had the plating composed of
Au=81.0±0.6 wt %,
Cu=13.9±0.2 wt %,
Ni=4.80±0.11 wt %,
Fe=0.24±0.08 wt %.

The samples were attached, one after another, to the positive pole of a direct current regulated power supply (BK Precision 1621A) and they were used as an anode. A stainless steel electrode weighing 196.4 g with dimensions of 26.2×3.1×0.3 cm was connected to the negative pole and served as a cathode. Both electrodes were installed vertically in a beaker and clipped with plastic clippers to the walls. A 1.5-cm stirring bar was rotated in the center of the beaker at 200 rpm. The beaker contained leaching solution composed of 95 ml of concentrated sulfuric acid and 5 ml of concentrated nitric acid. Considering the highest possible concentration of the concentrated nitric acid (70.0 wt %) and its density (1.41 g/mL), as well as the highest concentration of sulfuric acid (98.0 wt %) and its density (1.84 g/mL), the leaching solution contained:
sulfuric acid—94.2 wt %,
nitric acid—2.71 wt %,
and water—3.09 wt %.

During the first leach, the gold filled wires were not immersed into the solution completely, as the part of the wire which was attached to an alligator clip, was above the surface of the solution. When one side of the sample was deplated, the wire was turned and attached by the treated side, and the non-treated side was immersed in the solution. The initial electrical current parameters for the first sample were 1.2 A and 5.8V in a constant voltage mode. During the experiment the current was decreasing, and the solution gradually turned yellow. At the end of the stripping process the current dropped down to 0.01 A, and the experiment was stopped. The total process took 4.2 minutes. The sample was removed from the solution, washed with DI water, dried, and its surface was analysed by XRF in order to detect unstripped precious metals, if present. The analysis gave the following results:
Cu=99.2±0.4 wt %,
Fe=0.50±0.08 wt %,
Sb=0.23±0.11 wt %,
Co=0.039±0.030 wt %.
Similar treatment was done with the second wire, and its deplated surface had the following composition:
Cu=99.1±0.2 wt %,
Sb=0.75±0.09 wt %.

The results confirm that all the gold was stripped from the surface of the samples. Subsequently, the stripping solution was mixed with an amount of DI water that was 10 times larger than the leaching solution; the leaching solution was added to water by small portions and vigorous stirring. Black powder particles appeared in the diluted solution. Initially very fine, the particles agglomerated and became larger with time. The solution decanted fast and it was filtered using vacuum filtration unit and cellulose filter paper with the pore size of less than 0.45 micrometers. The recovered black solid was mixed with borax and smelted in a furnace at 1150° C. The resulting gold nugget's weight was 0.1609 g, which corresponds to 2.96 wt % of the untreated sample. The surface of the nugget was analyzed by XRF, showing the following elemental composition:
Au=94.7±0.3 wt %,
Cu=3.30±0.04 wt %,
Ni=2.0±0.04 wt %.
which is evidence of a high purity of gold.

EXAMPLE 3

This example describes experiments in which leaching solutions having varying concentrations of nitric acid were used to remove silver from silver-plated ware. A piece of a flat silver plated ware was cut into several pieces of approximatively the same size, and each piece was weighed and analyzed by XRF. The typical elemental composition of this material was:
Cu=61.7±0.5 wt %,
Zn=30.4±0.4 wt %,
Ag=4.90±0.30 wt %,
Ni=3.00±0.13 wt %.
A piece of stainless steel having dimensions of 15.5×1.1×0.3 cm was used as a cathode and each piece of silver plated ware was used as an anode. Both the cathode and the anode were connected to the corresponding pole of direct current regulated power supply (BK Precision 1621A). Leaching solutions were prepared, which were composed of 75 ml of concentrated sulfuric acid and volumes of nitric acid that varied from 0.1 ml in the first experiment to 20 ml in the last experiment (See Table 1 below). The leaching solution was poured in a 200 ml beaker and stirred by a magnetic stirrer. The solution was heated to 60° C. and this temperature was kept constant during the experiments.

At the beginning of each experiment a maximum current (0.09 A) was established in constant voltage mode, and both the starting current and the starting voltage (2.9V) had the same values for all experiments. Each time the deplating process was stopped as soon as the current dropped to 0.01 A. The remaining piece of the sample was then removed from the solution, washed with DI water, dried, and weighed. The sample's surface was analyzed by XRF. At the lowest concentration of nitric acid (0.07 wt %), all the silver was removed from the sample when the current dropped down to 0.01 A. The same complete removal of silver was achieved in all of the following experiments. The time required for the current to drop to zero was monitored. The surface of the deplated items was analyzed by XRF and was shown to be a copper-zinc alloy:

Cu=64.9±0.4 wt %,
Zn=35.1±0.4 wt %.

At a concentration of nitric acid equal to 10.87 wt %, intense evolution of colorless fumes started, and the intensity of the fumes increased at 11.88%. At 10.87 wt % of nitric acid, the experiment started at 2.9V and 0.09 A, as in all the previous cases, but instead of dropping down, the current increased up to 0.22 A during the first minute, and started to drop down only afterwards. The processing time increased compared to the cases when the concentration of the nitric acid was lower. At 11.88 wt % the phenomenon of current increase repeated; it increased up to 0.22 A during the first 1.15 min of treatment, and subsequently decreased. The deplating process took 7.23 min, which is 3.5-4.5 times longer than the process took at lower concentrations of nitric acid. High currents and long processing times mean the sudden increase of the consumption of energy, which resulted in the increase of the temperature of the solution up to 90° C., which provoked even higher evolution of fumes. The results of these experiments are presented in Table 1.

EXAMPLE 4

This example describes experiments in which leaching solutions having varying concentrations of nitric acid were used to remove gold from gold-plated copper wire. A piece of a gold plated copper wire was cut into the sections of approximatively similar length and weight, and the pieces were analyzed by XRF before and after each deplating process. An example of the XRF analysis of the wire before deplating is presented below:

Au=38.2±0.7 wt %,
Ni=36.5±0.4 wt %,
Cu=24.9±0.3 wt %,
Fe=0.21±0.10 wt %.

The experiment was repeated as described in Example 3. In the first experiment, all gold was removed from the wire, confirmed by XRF analysis. As the nitric acid concentration in the leaching solution was increased, all the gold was always removed from the treated samples, but the percentage weight loss of the samples continuously increased. At a nitric acid concentration of 10.87 wt %, intense generation of colorless fumes was observed, which made experiments using such high levels of nitric acid difficult to perform. Increasing the concentration of nitric acid up to 11.88 wt % lead to almost triple the percentage weight loss, compared to the percentage weight loss of the first sample. Additionally, the acid fumes became very heavy, the time of treatment almost doubled; accordingly, further increase of nitric acid concentration were stopped. The results of these experiments are summarized in Table 2.

TABLE 1

Results for deplating silver plated wire samples

| sulfuric acid in leach sol. (mL) | nitric acid in leach sol. (mL) | sulfuric acid in leach sol. (wt %) | nitric acid in leach sol. (wt %) | water in leach sol. (wt %) | sample mass before leach (g) | sample mass after leach (g) | weight loss (%) | time of treatment (min) | notes |
|---|---|---|---|---|---|---|---|---|---|
| 75.00 | 0.10 | 97.90 | 0.07 | 2.03 | 3.738 | 3.727 | 0.305 | 1.05 | all Ag removed |
| 75.00 | 0.50 | 97.50 | 0.36 | 2.14 | 3.732 | 3.718 | 0.362 | 1.08 | all Ag removed |
| 75.00 | 2.50 | 95.56 | 1.74 | 2.70 | 4.326 | 4.309 | 0.386 | 0.50 | all Ag removed |
| 75.00 | 9.00 | 89.75 | 5.89 | 4.36 | 4.202 | 4.184 | 0.436 | 2.03 | all Ag removed |
| 75.00 | 14.00 | 85.74 | 8.76 | 5.50 | 3.194 | 3.184 | 0.326 | 1.21 | all Ag removed |
| 75.00 | 16.30 | 84.01 | 9.99 | 6.00 | 4.132 | 4.110 | 0.532 | 2.10 | all Ag removed |
| 75.00 | 18.00 | 82.78 | 10.87 | 6.35 | 4.489 | 4.464 | 0.550 | 4.36 | current increase, fumes |
| 75.00 | 20.00 | 81.37 | 11.88 | 6.75 | 5.045 | 5.021 | 0.470 | 7.23 | current increase, fumes |

TABLE 2

Results for deplating gold plated wire samples.

| sulfuric acid in leach sol. (mL) | nitric acid in leach sol. (mL) | sulfuric acid in leach sol. (wt %) | nitric acid in leach sol. (wt %) | water in leach sol. (wt %) | sample mass before leach (g) | sample mass after leach (g) | weight loss (%) | time of treatment (min) | notes |
|---|---|---|---|---|---|---|---|---|---|
| 75.00 | 0.10 | 97.90 | 0.07 | 2.03 | 0.239 | 0.237 | 0.753 | 1.25 | all gold removed |
| 75.00 | 0.50 | 97.50 | 0.36 | 2.14 | 0.221 | 0.220 | 0.858 | 1.00 | all gold removed |
| 75.00 | 2.50 | 95.56 | 1.74 | 2.70 | 0.212 | 0.211 | 0.707 | 1.05 | all gold removed |
| 75.00 | 5.80 | 92.52 | 3.92 | 3.57 | 0.242 | 0.239 | 1.035 | 1.50 | all gold removed |
| 75.00 | 9.00 | 89.75 | 5.89 | 4.36 | 0.266 | 0.263 | 1.055 | 1.25 | all gold removed |
| 75.00 | 12.50 | 86.90 | 7.93 | 5.17 | 0.257 | 0.253 | 1.401 | 1.30 | all gold removed |
| 75.00 | 13.30 | 86.28 | 8.37 | 5.35 | 0.228 | 0.224 | 1.450 | 1.26 | all gold removed |
| 75.00 | 14.00 | 85.74 | 8.76 | 5.50 | 0.215 | 0.211 | 1.491 | 1.50 | all gold removed |
| 75.00 | 15.00 | 84.98 | 9.30 | 5.72 | 0.209 | 0.206 | 1.434 | 1.20 | all gold removed |
| 75.00 | 16.30 | 84.01 | 9.99 | 6.00 | 0.257 | 0.254 | 1.321 | 1.00 | all gold removed |
| 75.00 | 18.00 | 82.78 | 10.87 | 6.35 | 0.239 | 0.235 | 1.509 | 1.23 | very strong acid fumes |
| 75.00 | 20.00 | 81.37 | 11.88 | 6.75 | 0.223 | 0.218 | 2.156 | 2.09 | very strong acid fumes |

EXAMPLE 5

A piece of a gold plated copper wire similar to those used in Example 4 was prepared and weighed (0.6274 g). 60 ml of concentrated sulfuric acid was heated to 60° C. and a measured quantity of manganese dioxide (0.427 g) was added to it by stirring. The solution was stirred for 20 minutes, then removed from heat and left overnight. No gas evolution was detected. The next day, the solution had dark rose color and some unreacted/undissolved black powder on the bottom. The solution was used in an electrolytic process, in which the gold plated wire served as an anode and a piece of stainless steel served as a cathode (the same as in the Example 4). When the power supply was turned on, a current of 0.12 A and a voltage of 3.2V was applied to the electrode in constant voltage mode. The current started to diminish, and when it reached 0.04 A, the voltage was increased to 12.3 A, to increase the current and deplate the material faster. Soon afterwards, the current dropped down to 0.01 A. The total processing time was 5.07 minutes. During the electrolytic process, intensive evolution of gas was observed, which was much more intensive than the evolution of gas typical for the deplating procedures in the mixtures of sulfuric acid and nitric acid. Without wishing to be bound by any particular theory, it is believed that the oxygen, liberated in the reaction of $MnO_2$ with the hot concentrated sulfuric acid, is responsible for dissolution of gold.

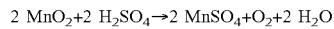

$$2\ MnO_2 + 2\ H_2SO_4 \rightarrow 2\ MnSO_4 + O_2 + 2\ H_2O$$

The deplated wire was removed from the solution, rinsed, dried, weighed (0.6198 g) and analyzed by XRF. The amount of weight that was lost corresponded to 1.21% of the initial weight of the wire. The results of the XRF analysis were:

Cu=96.9±0.5 wt %,
Ni=3.03±0.08 wt %.

This demonstrated that that the gold was removed from the surface of the wire.

EXAMPLE 6

A sample of silver-tungsten containing pellets was prepared. The pellets had different silver/tungsten weight proportions, which also varied between the surface and the center of the pellets, but in general, the pellets contained about 50 wt % of silver metal and 50 wt % of tungsten-containing material (tungsten metal or tungsten carbide). The concentration of silver on the surface of the pellets was generally higher or equal to 50 wt %, but in the center of the pallets, the concentration of silver was as low as 5-8 wt %, the rest being tungsten. If the tested pellets are brought in contact with the leaching solution without preliminary size reduction, the silver containing in the center of the pellets will be inaccessible for the leaching solution and hence, will be lost. To avoid this situation, the sample of the silver-tungsten containing material was shredded into particles with sizes less than 2 mm. The XRF analysis of a randomly taken sample of the powder gave the following results:

W=59.4±0.8 wt %,
Ag=37.7±0.8 wt %,
Fe=0.52±0.11 wt %,
Cu=0.21±0.11 wt %.

A sample of this powder weighing 125.31 g was mixed with a leaching solution containing 1250 ml of concentrated sulfuric acid and 250 ml of concentrated nitric acid, and was left to react for 1 hour at 60° C. with stirring at 300 rpm. Considering the densities of the acids, the weight percentage of the components in the solution was:

sulfuric acid—84.98 wt %,
nitric acid—9.3 wt %,
and water—5.72 wt %.

The solution took the color of the black powder, which had been liberated by the dissolution of silver. At the end of the process, the solution was added to a volume of DI water that was 5 times larger than the volume of the leaching solution, adding small portions at a time and using vigorous stirring. Subsequently, the powder was decanted and separated from the solution using vacuum filtration on Whatman Grade 52 paper filters. The recovered powder was dried and analyzed by XRF and determined to be almost pure tungsten:

W=96.1±0.6 wt %,
Ag=0.22±0.08 wt %.

The remaining 3-4% were most likely carbon based (because carbon cannot be detected by XRF), and the analyzed material would accordingly be tungsten carbide. The tungsten material looked like black powder. The weight of the recovered powder was 62.416 g.

The leaching solution free of solids contained dissolved silver. An excess of 10N NaOH solution was added to the leaching solution (mixing small portions at a time) causing dark-grey precipitate of silver oxide to appear. Addition of NaOH continued until the chloride-ion test (conducted on a drop of the solution), showed no opaqueness. The silver oxide powder was filtered out of the solution using vacuum filter, dried, mixed with borax, and melted in the furnace at 1050° C. The purity of the recovered silver nugget was analyzed by XRF:

Ag=99.8±0.2 wt %,
Zn=0.11±0.05 wt %,
Cu=0.08±0.042 wt %.

Its weight was 62.040 g. The results of the experiments are presented in Table 3.

TABLE 3

Results for silver recovery from silver-tungsten containing samples.

| | |
|---|---|
| Mass of the initial sample, g | 125.32 |
| Mass of recovered tungsten carbide, g (wt %) | 62.41 (49.8%) |
| Mass of recovered silver nugget, g (wt %) | 62.04 (49.5%) |
| Calculated mass of base metals and/or losses, g (wt %) | 0.87 (0.7%) |

For comparison, the same amount of powdered pellets was mixed with a solution containing 50% by volume of concentrated nitric acid, with the rest being DI water. The solution was left for 3 hours stirred at 300 rpm and heated to 60° C. A build-up of brown $NO_x$ was observed. Evaporation losses were replenished with the addition of fresh leaching solution during the experiment. The solid fraction changed color to canary green, which is a characteristic color of tungsten trioxide ($WO_3$). After 3 hours, a small sample of the solid fraction was removed from the beaker, rinsed with DI water, dried, and analyzed by XRF. The sample contained 19 wt % silver. The leaching of the sample continued for additional 3 hours. Subsequently, the solution was diluted with 2 volumes of DI water and filtered using a vacuum filter. The canary green powder was recovered, rinsed with DI water, dried, and analyzed by XRF:

W=90.0±1.2 wt %,
Ag=4.82±0.38 wt %,
Fe=1.86±0.19 wt %,
Cu=1.00±0.16 wt %,
Ni=0.18±0.18 wt %.

This analysis shows relatively large amount of the residual non-extracted silver.

EXAMPLE 7

A sample containing silver and cadmium oxide alloy plated on a copper substrate was prepared. The sample was 8.1×2.8 cm in size and had two thick silver-cadmium oxide fillings on one side of the copper plate. Both surfaces of the sample were analyzed by XRF. The copper substrate was made of pure copper:

Cu=99.9±0.1 wt %.

The surface of the silver-cadmium oxide plating had the following composition:

Ag=87.6±0.6 wt %,
Cd=12.1±0.3 wt %,
Cu=0.15±0.04 wt %,
Ni=0.044±0.041 wt %.

The inner layers of the plating may have contained up to 12-17 wt % of cadmium. The weight of the sample was 47.795 g. A leaching solution was prepared, composed of 304 ml of concentrated sulfuric acid and 16 ml of concentrated nitric acid. Considering the densities of the acids, the concentration of pure nitric acid in this solution was equal to 2.71 wt %, the concentration of pure sulfuric acid was equal to 94.20 wt %, and the concentration of water was 3.09 wt %.

The leaching solution was poured into a 500 ml beaker; a stainless steel cathode with dimensions of 26.2×3.1×0.3 cm was clipped to the wall of the beaker, and the sample plate served as an anode. The cathode and the anode were connected to the corresponding poles of the DC power supply BK Precision 1794. An initial current at 4.2 A at 9.3V was applied to the electrodes in constant voltage mode. During the leaching process the current increased to 5.8 A and after some time started to diminish. The current dropped to 0.02 A in 1 hour and 5 minutes. The copper plate was detached and removed from the leaching solution; there was no visual evidence of any remaining unstripped plating. The copper plate was rinsed with DI water, dried, weighed, and analysed by XRF; the mass of the stripped copper plate was 30.924 g; the XRF analysis of the stripped area showed pure copper. The total amount of leaching solution after finishing the process was 310 ml. A sample of the leaching solution was analyzed by ICP and following concentrations of the dissolved metals were obtained:

Ag=42836.1 mg/L,
Cu=824.980 mg/L,
Cd=6031.14 mg/L.

This process allows one to obtain the amounts of metals which were dissolved in the sample of 310 ml: mass of silver—13.27g, mass of cadmium—1.87 g and mass of copper—0.82 g. Striping of silver-cadmium oxide plating led to some dissolution of copper, which resulted in 2.6 wt % of the total copper weight.

The leaching solution containing all the dissolved metals was gradually added to a volume of DI water 10 times greater than the volume of the leaching solution by continuous stirring. 10N solution of NaOH was added until the pH increased to 4. Subsequently, 5 g of sodium formate was added and the solution was stirred at a temperature close to boiling for 1 hour. The precipitated silver was separated from the solution by vacuum filtration, it was washed, dried, mixed with borax, and melted in a furnace at 1050° C. A nugget weighing 12.736 g was recovered. The difference between the weight of the recovered silver and its calculated amount based on the ICP measurement was 4.2%. The elemental composition of the recovered nugget was analyzed by XRF and showed:

Ag=99.3±0.7 wt %,
Ni=0.40±0.07 wt %,
Zn=0.21±0.05 wt %.

For comparison, another sample of the silver-cadmium oxide on copper substrate was prepared, and the experiment described above was repeated, but the proportions of the acids in the leaching solution were changed: it contained 270 ml of concentrated sulfuric acid and 90 ml of concentrated nitric acid. Considering the highest possible concentration of the concentrated nitric acid (70.0 wt %) and its density (1.41 g/mL), as well as the highest concentration of sulfuric acid (98.0 wt %) and its density (1.84 g/mL), the concentration of pure nitric acid in this solution was equal to 14.24 wt %, the concentration of pure sulfuric acid 78.06 wt %, and the concentration of water 7.70 wt %.

The stripping process started as usual, but as the solution started to heat up, a large amount of brown $NO_x$ appeared over the beaker, a large amount of heat was generated, the solution started to boil, and a sharp increase of current was observed. The reaction became non-controllable and the color of the solution changed to blue, which is characteristic for situations in which large amounts of copper are dissolved, an undesirable outcome for the selective recovery of precious metals.

EXAMPLE 8

This example demonstrates that a non-nitric-acid source of nitrate ions can be used in the leaching solution. Certain experiments were performed in which a salt of nitric acid was used instead of nitric acid in the leaching solution. The salt provided a source of nitrate ions in the leaching solution, and $H^+$ ions were present in the leaching solution because of dissociation of other acids (e.g., sulfuric or phosphoric).

A leaching solution containing 25 ml of sulfuric acid (95.0 to 98.0 w/w %) and 5.00 g of solid $KNO_3$ was prepared. The weight of the nitrate ion in this solution was equal to 3.07 g. (An equivalent amount of nitrate ions would be introduced by using 3.12 g of 100% pure nitric acid.) A solution containing 5 g of solid potassium nitrate would therefore introduce an approximately equivalent amount of nitrate ions as a leaching solution containing 89.13 wt % sulfuric acid, 6.16 wt % nitric acid, and 4.71 wt % water.

The leaching solution was heated to 60° C. and stirred. A piece of scrap containing copper heavily plated with silver was immersed in the solution and left for 45 minutes, during which the silver plating lost 70.6% of its initial weight. No $NO_x$ formation was observed.

For comparison, a leaching solution containing 25 ml of sulfuric acid (95.0 to 98.0 w/w %) and 12.14 g of solid $KNO_3$ was prepared and heated to 60° C. The weight of the nitrate ion in the prepared solution was 7.445 g. (The amount of nitrate ions in this solution was substantially equal to the amount that would be present in a solution containing 7.565 g of pure nitric acid.) A solution containing 12.14 g of solid potassium nitrate would therefore introduce an approximately equivalent amount of nitrate ions as a leaching solution containing 78.92 wt % sulfuric acid, 13.24 wt % nitric acid, and 7.83 wt % water.

A piece of scrap containing copper heavily plated with silver—similar to those used for the previous experiment—was weighted and subsequently placed into the beaker with the heated leaching solution. The scrap was kept in the leaching solution for 1 hour and stirred. Evolution of heavy $NO_x$ gases was observed during the leaching as well as formation of voluminous precipitate, which volume represented more than half of the volume of the solution at the end of the experiment. The silver plating lost only 10.12% of its weight.

EXAMPLE 9

Two different leaching solutions were prepared using sulfuric acid (95.0 to 98.0 w/w %), nitric acid (68.0 to 70.0 w/w %) and methane sulfonic acid (MSA, 70 wt %). The percentages of pure acids in the solutions are presented in the table below:

|  | wt % $H_2SO_4$ | wt % $HNO_3$ | wt % MSA | wt % $H_2O$ |
|---|---|---|---|---|
| Sample 1 | 84.98 | 9.30 | 0 | 5.72 |
| Sample 2 | 83.08 | 9.10 | 1.56 | 6.26 |

Figure 12:
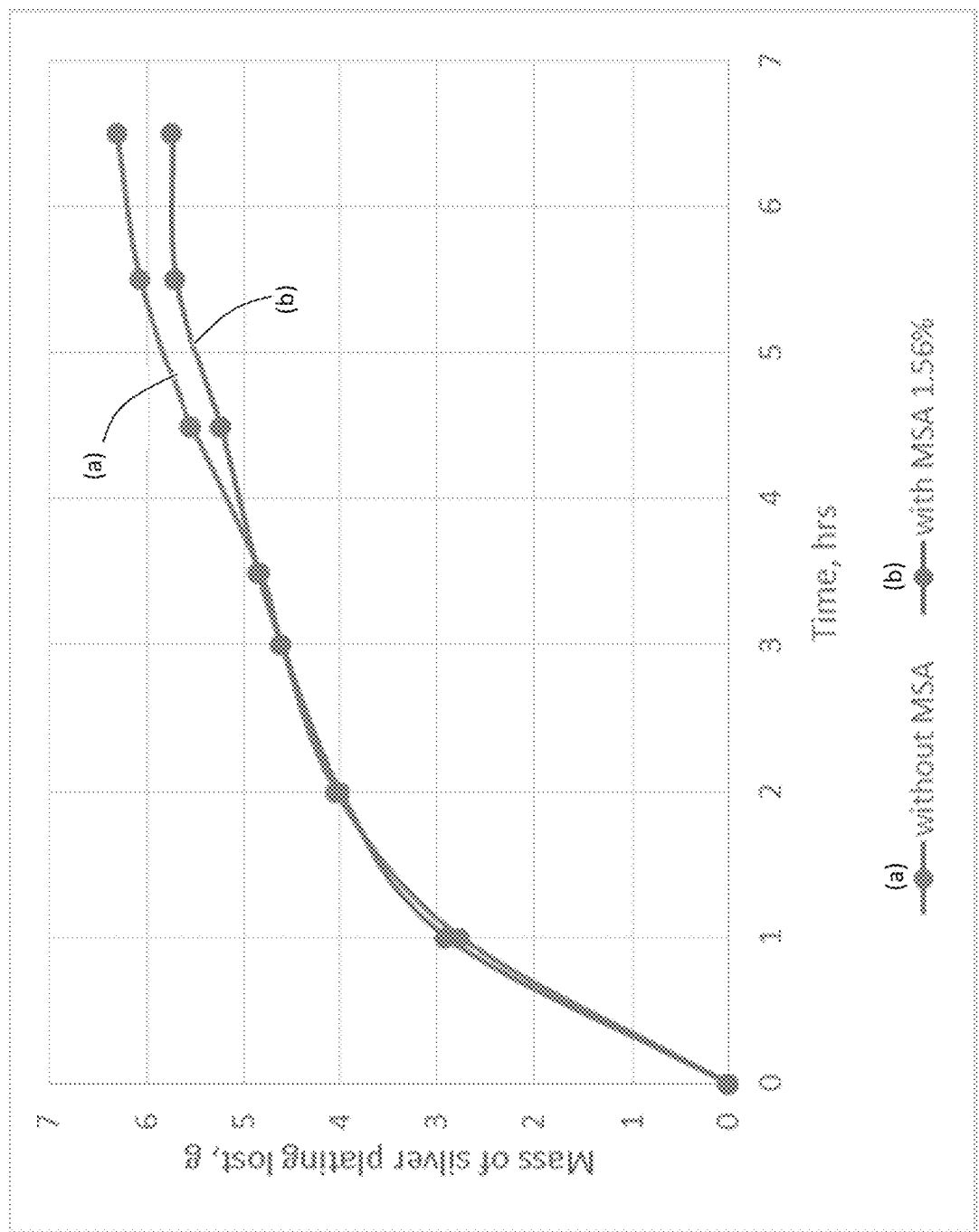
FIG. 12 is a plot of the mass of silver dissolved as a function of time for one set of experiments in which methane sulfonic acid is used in the leaching solution and another set of experiments in which methane sulfonic acid is not used in the leaching solution.

The solutions were heated to 60° C. and stirred, and two identical samples of silver plated copper scrap were placed in the beakers (during which, stirring continued). Each hour, the samples were taken out of the solutions, dried, weighed, and placed back into the solution. FIG. 12 is a plot of the mass of plating lost as a function of time. As shown in FIG. 12, it is evident that the solution containing MSA was nearly as efficient at removing silver as the solution without it. It was observed that the leaching solutions containing MSA were able to keep more metals in dissolved form, and that formation of solid precipitate of silver sulfate occurred later, compared to experiments performed when similar solutions not containing MSA were used.

For comparison, a leaching solution containing 55.46 wt % sulfuric acid, 28.96 wt % methane sulfonic acid, and 15.58 wt % water was prepared. The leaching solution was heated and stirred as in the previous experiments described in this example, and a silver plated sample substantially the same as those used above was placed in the solution. After 1.5 hours, the sample was removed from the solution, rinsed with DI water, dried, and weighed. Substantially no silver had been removed from the sample.

EXAMPLE 10

In order to demonstrate the functionality of the method of the present invention for treatment larger quantity of materials, a sample of karat gold filled jewelry (including different items such as rings, watches, bracelets, chains, and pendants) was prepared. The initial weight of the jewelry was 4.7 kg.

An electrolytic cell was built, including a rotating barrel, which was immersed in a plastic tank containing the leaching solution during operation. Three stainless steel plates, each having dimensions 26.2 cm×3.1 cm×0.5 cm were attached to the inner wall of the tank using plastic clips and connected together using electrical wires. These plates were connected to the negative pole of a direct current power supply (BK Precision 1621A) and served as a cathode. The rotating barrel (Model 66) was manufactured by Sterling Systems. It includes a 6"×6" barrel, made of polypropylene, with square holes of 0.093" in the walls of the cylinder.

The barrel was attached to a stand, which was installed in a tank containing the chemical solution, and turned by the action of 57 rpm-110V AC motor. Copper contacts were inserted into the center of the barrel from its sides so that, during rotation of the barrel, each item placed in the barrel remained in electrical contact either with a contact or with another item, which was in electrical contact with the lead. The leads were attached to copper bars at both sides of the barrel, which were connected to the positive pole of the power supply.

The barrel with the stand was attached to a chain hoist, so that the barrel could be lifted over the leaching tank and in such a way, removed from the leaching solution. The leaching tank was custom made of grey PVC, and had the inner dimensions H×L×W=12"×14"×11". The total amount of scrap items was divided into 8 parts, each weighing between 400 g and 800 g. The leaching solution was prepared in the leaching tank, and contained 93.31 wt % sulfuric acid, 2.69 wt % nitric acid, 0.94 wt % sulfamic acid, and 3.06 wt % water.

The first part of the karat gold filled scrap was loaded into the rotating barrel, the opening of the barrel was closed, and the barrel was immersed into the leaching solution. The electrodes were connected to the power supply, the motor was turned on, and the barrel was rotated. The electric parameters were kept in constant voltage mode. The current and the voltage differed between batches, generally remaining in the range of 20-28 V and 12-19 A. During the processing of each batch, the electric current diminished, and dropped down to 0.01 A-0.03 A. At this moment, the rotating barrel was disconnected from the power supply, the rotation was stopped, the barrel was lifted out of the solution and left in this position for some time so that the residual leaching solution could drop into the leaching tank. Subsequently, the lifted barrel was pulled to the side so that it was hanging over a containment box, and the barrel was placed in it. The loading window of the barrel was opened, and the stripped scrap items were removed from the barrel and rinsed with DI water. The DI water was kept, as it contained some gold and dissolved silver. All the batches were treated with the same stripping solution. The leaching experiments were carried out on randomly selected dates during a 3-week period. No acid replenishment was performed during the testing. The leaching solution changed from light yellow in color after the first three batches, and the intensity of the color did not change during the rest of the experiments. Some black precipitate accumulated on the cathodes and on the bottom of the leaching tank. At the end of the process, the leaching solution was added by portions using the corrosion resistant chemical pump into a 5-times larger volume of DI water, which was stirred with an overhead mixer using an extended stirring rod. The black powder decanted quickly and was transformed into large black flakes with time. To recover the gold and the silver mixed together, the gold powder was not filtered right away, but left in the solution. Scrap copper pieces were added and left in the solution overnight. The chloride ion test, made on the solution sample, did not show any substantial opaqueness, meaning that substantially all silver precipitated in the form of silver metal. The pieces of copper were removed from the solution and rinsed in an ultrasonic bath. The rinse water was filtered in order to collect the powder. The mixed gold and silver powder was decanted and filtered out of the solution. A randomly taken sample of the powder was analyzed by XRF providing with the following elemental composition:

$Au=60.9\pm0.5$,
$Ag=38.0\pm0.5$,
$Cu=0.77\pm0.06$,
$Pb=0.23\pm0.12$.

The powder was distributed between four fused silica crucibles, mixed with some borax, and melted in a furnace at 1150° C. Nuggets of gold-silver alloy were recovered, and had a total weight of 210.91 g. As the silver and gold powder were not perfectly blended to provide a uniform mixture, the nuggets had different proportions of gold and silver. As an example, the elemental composition of one of the nuggets is presented below:

$Au=56.4\pm0.4$,
$Ag=43.2\pm0.4$,
$Cu=0.38\pm0.04$.

Gold and silver combined to account for 99.6 wt % of the recovered metal, with the main impurity being copper.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
   exposing a material comprising at least one noble metal and at least one base metal to a mixture comprising nitrate ions and at least one sulfonic acid such that at least a portion of the at least one noble metal is removed from the material,
   wherein:
      the amount of nitrate ions within the mixture is less than or equal to about 10 wt %, and
      the total amount of the at least one sulfonic acid within the mixture is less than about 25 wt %.

2. The method of claim 1, wherein the mixture further comprises sulfuric acid.

3. The method of claim 2, wherein the amount of sulfuric acid within the mixture is at least about 50 wt %.

4. The method of claim 1, wherein at least a portion of the nitrate ions originate from nitric acid.

5. The method of claim 1, wherein the at least one sulfonic acid comprises a sulfonic acid represented by:

$$RS(=O)_2-OH,$$

where R symbolizes an alkyl group containing 1-12 carbon atoms, an alkenyl group containing 1-12 carbon atoms, a hydroxyalkyl group containing 1-12 carbon atoms, or an aryl group containing 6-12 carbon atoms.

6. The method of claim 1, wherein the at least one sulfonic acid comprises an alkanesulfonic acid comprising an alkyl group containing 1-5 carbon atoms.

7. The method of claim 1, wherein the at least one sulfonic acid comprises methanesulfonic acid.

8. The method of claim 1, wherein the amount of water within the mixture is less than about 8 wt %.

9. The method of claim 1, wherein the at least one noble metal comprises gold, and the exposing is performed such that at least a portion of the gold is removed from the material.

10. The method of claim 1, wherein the weight ratio of the combined amount of gold, silver, platinum, and palladium removed from the material to the amount of base metal removed from the material is at least about 10:1.

11. The method of claim 10, wherein the at least one noble metal comprises gold, and the exposing is performed such that at least a portion of the gold is removed from the material.

12. The method of claim 11, wherein the weight ratio of the amount of gold removed from the material to the amount of base metal removed from the material is at least about 10:1.

13. The method of claim 1, wherein the at least one noble metal comprises silver, and the exposing is performed such that at least a portion of the silver is removed from the material.

14. The method of claim 13, wherein the weight ratio of the amount of silver removed from the material to the amount of base metal removed from the material is at least about 10:1.

15. The method of claim 1, wherein the at least one noble metal comprises platinum, and the exposing is performed such that at least a portion of the platinum is removed from the material.

16. The method of claim 15, wherein the weight ratio of the amount of platinum removed from the material to the amount of base metal removed from the material is at least about 10:1.

17. The method of claim 1, wherein the at least one noble metal comprises palladium, and the exposing is performed such that at least a portion of the palladium is removed from the material.

18. The method of claim 17, wherein the weight ratio of the amount of palladium removed from the material to the amount of base metal removed from the material is at least about 10:1.

19. The method of claim 1, further comprising forming a noble-metal-containing solid from removed noble metal.

20. The method of claim 19, further comprising at least partially separating the noble-metal-containing solid from the mixture.

* * * * *